United States Patent
Sandhu et al.

(10) Patent No.: US 7,599,493 B2
(45) Date of Patent: *Oct. 6, 2009

(54) ASYMMETRIC KEY PAIR HAVING A KIOSK MODE

(75) Inventors: Ravinderpal Singh Sandhu, Oak Hill, VA (US); Brett Jason Schoppert, Leesburg, VA (US); Ravi Ganesan, Half Moon Bay, CA (US); Mihir Bellare, San Diego, CA (US); Colin Joseph deSa, Herndon, VA (US)

(73) Assignee: TriCipher Inc., San Mateo, CA (US)

( * ) Notice: Subject to any disclaimer, the term of this patent is extended or adjusted under 35 U.S.C. 154(b) by 659 days.

This patent is subject to a terminal disclaimer.

(21) Appl. No.: 11/056,114

(22) Filed: Feb. 14, 2005

(65) Prior Publication Data

US 2006/0182276 A1   Aug. 17, 2006

(51) Int. Cl.
*H04L 9/00*   (2006.01)
(52) U.S. Cl. .......................... 380/44; 380/277; 380/278; 380/279; 380/280; 380/281; 380/282; 380/283; 380/284; 380/285; 380/286; 726/3; 726/4; 726/5; 726/6; 726/7; 713/168; 713/169; 713/170; 713/171
(58) Field of Classification Search ................. 726/3–7; 380/277–286, 44; 713/155
See application file for complete search history.

(56) References Cited

U.S. PATENT DOCUMENTS

| | | | |
|---|---|---|---|
| 5,623,546 A | 4/1997 | Hardy et al. | |
| 5,768,388 A | 6/1998 | Goldwasser et al. | |
| 5,953,422 A * | 9/1999 | Angelo et al. | 713/185 |
| 6,026,163 A | 2/2000 | Micali | |
| 6,072,876 A | 6/2000 | Obata et al. | |
| 6,542,608 B2 * | 4/2003 | Scheidt et al. | 380/44 |
| 6,662,299 B1 | 12/2003 | Price, III | |
| 6,845,160 B1 | 1/2005 | Aoki | |
| 7,095,851 B1 | 8/2006 | Scheidt | |
| 7,260,552 B2 | 8/2007 | Riera Jorba et al. | |
| 2002/0078345 A1 * | 6/2002 | Sandhu et al. | 713/155 |
| 2003/0147536 A1 * | 8/2003 | Andivahis et al. | 380/277 |
| 2003/0172298 A1 * | 9/2003 | Gunter et al. | 713/201 |
| 2005/0002532 A1 | 1/2005 | Zhou et al. | |

OTHER PUBLICATIONS

RSA Laboratories, "PKCS #5 v2.0: Password-Based Cryptography Standard", Dec. 10, 1998, pp. 1-25.

* cited by examiner

*Primary Examiner*—Michael J Simitoski
*Assistant Examiner*—Kari L Schmidt
(74) *Attorney, Agent, or Firm*—Antonelli, Terry, Stout & Kraus, LLP.

(57) ABSTRACT

Techniques for providing different levels of access based upon a same authentication factor are provided. A first message is received that is transformed with a first portion of a split private key, the first portion based upon a user password and another factor, and the split private key associated with an asymmetric key pair having a public key and the split private key. The user is authenticated for a first level of network access based upon the received first message being transformed with the first portion. A second message is received that is transformed with a second portion of the split private key, the second portion based upon the password only and not combinable with the first portion to complete the split private key. The user is authenticated for a second level of network access different that the first level based upon the received second message being transformed with the second portion.

18 Claims, 15 Drawing Sheets

ASYMMETRIC KEY PAIR HAVING A KIOSK MODE

RELATED APPLICATIONS

This application is related to U.S. application Ser. No. 11/055,987, filed concurrently herewith, and entitled. "ARCHITECTURE FOR ASYMMETRIC CRYPTO-KEY STORAGE", U.S. application Ser. No. 11/055,986, filed concurrently herewith, and entitled "TECHNIQUE FOR ASYMMERIC CRYPTO-KEY GENERATION", U.S. application Ser. No. 11/056,120, filed concurrently herewith, and entitled "MULTIPLE FACTOR PRIVATE PORTION OF AN ASYMMETRIC KEY", U.S. application Ser. No. 11/055,988, filed concurrently herewith, and entitled "AUTHENTICATION PROTOCOL USING A MULTI-FACTOR ASYMMETRIC KEY PAIR", U.S. application Ser. No. 11/056,116, filed concurrently herewith, and entitled "ROAMING UTILIZING AN ASYMMETRIC KEY PAIR", and U.S. application Ser. No. 11/056,115, filed concurrently herewith, and entitled "TECHNIQUE FOR PROVIDING MULTIPLE LEVELS OF SECURITY". This application is also related to U.S. application Ser. No. 09/739,260, filed Dec. 19, 2000, and entitled "SYSTEM AND METHOD FOR CRYPTO-KEY GENERATION AND USE IN CRYPTOSYSTEM", U.S. application Ser. No. 10/849,818, filed May 21, 2004, and entitled "ONE TIME PASSWORD ENTRY TO ACCESS MULTIPLE NETWORK SITES", which is a continuation of U.S. application Ser. No. 09/739,114, filed Dec. 19, 2000, (now abandoned) and U.S. application Ser. No. 09/739,260, filed Dec. 19, 2000, U.S. application Ser. No. 09/739,112, filed Dec. 19, 2000, and entitled "HIGH SECURITY CRYPTO SYSTEM", U.S. application Ser. No. 09/739,113, filed Dec. 19, 2000, and entitled "SECURE COMMUNICATIONS NETWORK WITH USER CONTROL OF AUTHENTICATED PERSONAL INFORMATION PROVIDED TO NETWORK ENTITIES", U.S. application Ser. No. 09/739,119, filed Dec. 19, 2000, and entitled "METHOD AND SYSTEM FOR AUTHORIZING GENERATION OF ASYMMETRIC CRYPTO KEYS", U.S. Application Ser. No. 09/739,118, filed Dec. 19, 2000, and entitled "SYSTEM AND METHOD FOR AUTHENTICATION IN A CRYPTO SYSTEM UTILIZING SYMMETRIC AND ASYMMETRIC CRYPTO KEYS"and U.S. application Ser. No. 09/739,111, filed Dec. 19, 2000, and entitled "SYSTEM AND METHOD FOR GENERATION AND USE OF ASYMMETRIC CRYPTO KEYS EACH HAVING A PUBLIC PORTION AND MULTIPLE PRIVATE PORTIONS". This application claims priority based upon Provisional U.S. Application Ser. No. 60/644,028, filed Jan. 18, 2005, and entitled "THE TRICIPHER ARMORED CREDENTIAL SYSTEM", the contents of which are incorporated herein in their entirety by reference.

TECHNICAL FIELD

This invention relates to cryptosystems. More particularly, the present invention relates to split key cryptosystem having multiple levels of security.

BACKGROUND ART

Today, computing devices are almost always interconnected via networks. These networks can be large closed networks, as within a corporation, or truly public networks, as with the Internet. A network itself might have hundreds, thousands or even millions of potential users. Consequently it is often required to restrict access to any given networked computer or service, or a part of a networked computer or service, to a subset of the users on the public or closed network. For instance, a brokerage might have a public website accessible to all, but would like to only give Ms. Alice Smith access to Ms. Alice Smith's brokerage account.

Access control is an old problem, tracing its roots to the earliest days of computers. Passwords were among the first techniques used, and to this day remain the most widely used, for protecting resources on a computer or service.

In its simplest form, known as single factor authentication, every user has a unique password and the computer has knowledge of the user password. When attempting to log on Alice would enter her userid, say alice, and password, say apple23, the computer would compare the pair, i.e. alice, apple23, with the pair it had stored for Alice, and if there is a match would establish a session and give Alice access.

This simple scheme suffers from two problems. First, the table containing the passwords is stored on the computer, and thus represents a single point of compromise. If Eve could somehow steal this table, she would be able to access every user's account. A second problem with this approach is that when Alice enters her password it travels from her terminal to the computer in the clear, and Eve could potentially eavesdrop. Such eavesdropping is known as a Man-In-The-Middle attack. For instance the "terminal" could be Alice's PC at home, and the computer could be a server on the Internet, in which case her password travels in the clear on the Internet. It will be recognized by those with ordinary skill in the art that a Man-in-The-Middle attack can go beyond eavesdropping to modify the contents of the communication.

Various solutions have been proposed and implemented to solve these two issues. For instance, to solve the first problem of storing the password on the computer, the computer could instead store a one way function of the password. E.g. F(apple23)=XD45DTY, and the pair {alice, XD45DTY}. In this example as F( ) is a one way function, computing XD45DTY from apple23 is easy, but as it is a "one way function", the reverse is believed to be computationally difficult or close to impossible. So when Alice logs on and sends the computer {alice, apple23}, the computer can compute F(apple23) and compare the result with XD45DTY. The UNIX operating system was among the first to implement such a system in the 1970's. However, this approach, while solving the problems due to the storage of the password on the computer, does not solve the problem of the password traveling in the clear.

Multiple factor authentication also exists as a solution to the problems inherent with single factor authentication. In multiple factor authentication, at least knowledge of, if not actual possession of, at least two factors must be shown for authentication to be complete. It should be understood that in multiple factor authentication, each factor remains separate. That is, the factors are not combined. Further, the factors are not even concatenated. Several multiple factor authentication techniques exist, including one time password token techniques, encrypted storage techniques, smart card techniques, and split key techniques.

In one time password token techniques, two passwords are utilized, one being a permanent password associated with the user, and the other being a temporary, one-time use, password generated by a password generator. The permanent password may be optional. The temporary password has a finite usable life, such as sixty seconds. At the end of the useable life, another temporary password is generated. An authentication server knows each usable password as well as its useable life, based upon algorithms well known to one of ordinary skill in the art. A user transmits both the permanent password (first factor) and a temporary password (second factor) to the authentication server which then verifies both passwords. The passwords are transmitted in the clear, thus token techniques are subject to man-in-the-middle attacks.

Encrypted storage techniques utilize a cryptographic key, to be discussed further below, stored on either removable media or a hard drive. The cryptographic key is encrypted with a user's password. After decryption with the user's password, the key is then stored, at least temporarily, in memory of the user's computer system where it is used to either encrypt or decrypt information. As will be recognized by one of ordinary skill, this particular approach is undesirable due to it being susceptible to a dictionary attack, to be discussed in detail further below.

In smart card techniques, a private portion of an asymmetric cryptographic key, to be discussed further below, is stored on a smart card, which is portable. A specialized reader attached to a computer system is used to access the smart card. More particularly, the user enters a PIN (the first factor) to 'unlock' the smart card. Once unlocked, the smart card encrypts or decrypts information using the key stored thereon. It should be stressed that in smart card techniques the key never leaves the smart card, unlike in the encrypted storage techniques discussed above. Rather, electronics within the smart card itself perform the encrypting and/or decrypting. Smart card techniques are associated with certain problems. These problems include the fact that the technique is costly to implement, due to hardware costs. Further, a lack of readers makes use of a user's smart card difficult, and smart cards themselves are subject to loss.

Before discussing in detail the more sophisticated conventional techniques for authentication, which are based upon split key technology, let us briefly describe symmetric and asymmetric key cryptography.

In symmetric key cryptography, the two parties who want to communicate in private share a common secret key, say K. The sender encrypts messages with K, to generate a cipher, i.e. C=Encrypt(M,K). The receiver decrypts the cipher to retrieve the message, i.e. D=Decrypt(C,K). An attacker who does not know K, and sees C, cannot successfully decrypt the message, if the underlying algorithms are strong. Examples of such systems are DES3 and RC4. Encryption and decryption with symmetric keys provide a confidentiality, or privacy service.

Symmetric keys can also be used to provide integrity and authentication of messages in a network. Integrity and authentication means that the receiver knows who sent a message and that the message has not been modified so it is received as it was sent. Integrity and authentication is achieved by attaching a Message Authentication Code (MAC) to a message M. E.g., the sender computes S=MAC(M,K) and attaches S to the message M. When the message M reaches the destination, the receiver also computes S'=MAC(M,K) and compares S' with the transmitted value S. If S'=S the verification is successful, otherwise verification fails and the message should be rejected. Early MACs were based on symmetric encryption algorithms such as DES whereas more recently MACs are constructed from message digest functions, or "hash" functions, such as MD5 and SHA-1. The current Internet standard for this purpose is known as hash-based MAC (HMAC).

By combining confidentiality with integrity and authentication, it is possible to achieve both services with symmetric key cryptography. It is generally accepted that different keys should be used for these two services and different keys should be used in different directions between the same two entities for the same service. Thus if Alice encrypts messages to Bob with a shared key K, Bob should use a different shared key K' to encrypt messages from Bob to Alice. Likewise Alice should use yet another key K" for MACs from Alice to Bob and Bob should use K'" for MACs from Bob to Alice. Since this is well understood by those skilled in the art, we will follow the usual custom of talking about a single shared symmetric key between Alice and Bob, with the understanding that strong security requires the use of four different keys.

Symmetric key systems have always suffered from a major problem—namely how to perform key distribution. How do Bob and Alice agree on K? Asymmetric key cryptography was invented to solve this problem. Here every user is associated with two keys, which are related by special mathematical properties. These properties result in the following functionality: a message encrypted with one of the two keys can then only be decrypted with the other.

One of these keys for each user is made public and the other is kept private. Let us denote the former by E, and the latter by D. So Alice knows $D_{alice}$, and everyone knows $E_{alice}$. To send Alice the symmetric key K, Bob simply sends C=Encrypt(K, $E_{alice}$). Alice, and only Alice (since no one else knows $D_{alice}$), can decrypt the ciphertext C to recover the message, i.e. Decrypt(C,$D_{alice}$)=K. Now both Alice and Bob know K and can use it for encrypting subsequent messages using a symmetric key system. Why not simply encrypt the message itself with the asymmetric system? This is simply because in practice all known asymmetric systems are fairly inefficient, and while they are perfectly useful for encrypting short strings such as K, they are inefficient for large messages.

The above illustrates how asymmetric cryptography can solve the key distribution problem. Asymmetric cryptography can also be used to solve another important problem, that of digital signatures. To sign a message M, Alice encrypts it with her own private key to create S=Encrypt(M,$D_{alice}$). She can then send (M,S) to the recipient who can then decrypt S with Alice's public key to generate M', i.e. M'=Decrypt(S, $E_{alice}$). If M'=M then the recipient has a valid signature as only someone who has $D_{alice}$, by definition only Alice, can generate S, which can be decrypted with $E_{alice}$ to produce M. To convey the meaning of these cryptographic operations more clearly they are often written as S=Sign(M,$D_{alice}$) and M'=Verify(M,S,$E_{alice}$). It is worth noting that asymmetric key digital signatures provide non-repudiation in addition to the integrity and authentication achieved by symmetric key MACs. With MACs the verifier can compute the MAC for any message M of his choice since the computation is based on a shared secret key. With digital signatures this is not possible since only the sender has knowledge of the sender's private key required to compute the signature. The verifier can only verify the signature but not generate it. It will be recognized by those with ordinary skill in this art that there are numerous variations and elaborations of these basic cryptographic operations of symmetric key encryption, symmetric key MAC, asymmetric key encryption and asymmetric key signatures.

The RSA cryptosystem is one system that implements asymmetric cryptography as described above. In particular the RSA cryptosystem allows the same public-private key pair to be used for encryption and for digital signatures. It should be noted there are other asymmetric cryptosystems which implement encryption only e.g., ElGamal or digital signature only, e.g., DSA. Technically the public key in RSA is a pair of numbers E, N and the private key is the pair of numbers D, N. When N is not relevant to the discussion it is commonplace to refer to the public key as E and the private key as D.

Finally, the above description does not answer the important question of how Bob gets Alice's public key $E_{alice}$. The process for getting and storing the binding [Alice, $E_{alice}$] which binds $E_{alice}$ to Alice is tricky. The most practical method appears to be to have the binding signed by a common trusted authority. So such a "certificate authority" (CA) can create $CERT_{alice}$=Sign([Alice, $E_{alice}$], Dca). Now CERTalice can be verified by anyone who knows the CA's public key Eca. So in essence, instead of everyone having to know everyone else's public key, everyone only need know a single public key, that of the CA. More elaborate schemes with multiple Certificate Authorities, sometimes having a hierarchical relationship, have also been proposed.

Asymmetric key cryptosystems have been around for a long time, but have found limited use. The primary reasons are twofold: (a) the private key D in most systems is long, which means that users cannot remember them, and they have to either be stored on every computer they use, or carried around on smart cards or other media; and (b) the infrastructure for ensuring a certificate is valid, which is critical, is cumbersome to build, operate, and use. The first technique proposed to validate certificates was to send every recipient a list of all certificates that had been revoked. This clearly does not scale well to an environment with millions of users. The second method proposed was to require that one inquire about the validity of a certificate on-line, which has its own associated problems.

A system based on split private key cryptography has been developed to solve these two issues, among others. In this system the private key for Alice, i.e. $D_{alice}$, is further split into two parts, $D_{aa}$ which Alice knows, and a part $D_{as}$ which is stored at a security server. To sign a message, Alice could perform a partial encryption to generate a partial signature, i.e. PS=Sign(M,Das). Alice then sends the server PS which 'completes' the signature by performing S=Sign(PS,Dss). This completed signature S is indistinguishable from one generated by the original private key, so the rest of the process works as previously described. However, $D_{aa}$ can be made short, which allows the user to remember it as a password, so this system is consumer friendly. Further, if the server is informed that a particular ID has been revoked, then it will cease to perform its part of the operation for that user, and consequently no further signatures can ever be performed. This provides for instant revocation in a simple highly effective fashion. It will be recognized by those with ordinary skill in the art that use of a split private key for decryption purposes can be similarly accomplished, and that the partial signatures (or decryptions) may be generated in the opposite sequence, that is first on the security server and subsequently by the user's computer, or even be computed concurrently in both places and then combined.

Let us return now to password based systems. Challenge-response systems solve the issue of having to send passwords in the clear across a network. If the computer and Alice share a secret password, P, then the computer can send her a new random challenge, R, at the time of login. Alice computes C=Encrypt(R,P) and sends back C. The computer decrypts Decrypt(C,P)=C'. If C=C', then the computer can trust that it is Alice at the other end. Note however that the computer had to store P. A more elegant solution can be created using asymmetric cryptography. Now Alice has a private key $D_{alice}$, or in a split private key system she has $D_{aa}$. The computer challenges her to sign a new random challenge R. She signs the challenge, or in the split private key system she interacts with the security server to create the signature, and sends it back to the computer which uses her public key, retrieved from a certificate, to verify the signature. Observe that the computer does not have to know her private key, and that an eavesdropper observing the signature on R gains no knowledge of her private key.

The SSL system, which is widely used on the Internet, in effect implements a more elaborate method of exactly this protocol. SSL has two components, 'server side SSL' in which a server proves its identity by correctly decrypting a particular message during connection set-up. As browsers such as Netscape and Microsoft Internet Explorer come loaded with the public keys of various CAs, the browser can verify the certificate of the server and use the public key therein for encryption This authenticates the server to the client, and also allows for the set-up of a session key K, which is used to encrypt and MAC all further communications. Server side SSL is widely used, as the complexity of managing certificates rests with system administrators of web sites who have the technical knowledge to perform this function. The converse function in SSL, client side SSL, which lets a client authenticate herself to a server by means of a digital signature is rarely used, because although the technical mechanism is much the same, it now requires users to manage certificates and long private keys which has proven to be difficult, unless they use the split private key system. So in practice, most Internet web sites use server side SSL to authenticate themselves to the client, and to obtain a secure channel, and from then on use Userid, Password pairs to authenticate the client.

So far from disappearing, the use of passwords has increased dramatically. Passwords themselves are often dubbed as inherently "weak" which is inaccurate, because if they are used carefully passwords can actually achieve "strong" security. As discussed earlier passwords should not be sent over networks, and if possible should not be stored on the receiving computer. Instead, in a "strong" system, the user can be asked to prove knowledge of the password without actually revealing the password. And perhaps most critically passwords should not be vulnerable to dictionary attacks.

Introduced above, dictionary attacks can be classified into three types. In all three types the starting point is a 'dictionary' of likely passwords. Unless the system incorporates checks to prevent it, users tend to pick poor passwords, and compilations of lists of widely used poor passwords are widely available.

On line dictionary attack: Here the attacker types in a guess at the password from the dictionary. If the attacker is granted access to the computer they know the guess was correct. These attacks are normally prevented by locking the user account if there are an excessive number of wrong tries. Note that this very commonly used defense prevented one problem, but just created another one. An attacker can systematically go through and lock out the accounts of hundreds or thousands users. Although the attacker did not gain access, now legitimate users cannot access their own accounts either, creating a denial of service problem.

Encrypt dictionary attacks: If somewhere in the operation of the system a ciphertext C=Encrypt(M,P) was created, and the attacker has access to both C and M, then the attacker can compute off-line C1=Encrypt(M,G1), C2=Encrypt(M, G2), . . . where G1, G2, . . . etc. are the guesses at the password P from the dictionary. The attacker stops when he finds a Cn=C, and knows that Gn=P. Observe that the UNIX file system, which uses a one way function F( ) instead of an encryption function E( ), is vulnerable to this attack.

Decrypt dictionary attacks: Here the attacker, does not know M, and only sees the ciphertext C (where C=Encrypt (M,P)). The system is only vulnerable to this attack if it is true that M has some predictable structure. So the attacker tries M1=Decrypt(C,G1), M2=Decrypt(C,G2) . . . , and stops when the Mi has the structure he is looking for. For instance Mi could be known to be a timestamp, English text, or a number with special properties such as a prime, or a composite number with no small factors. Those with ordinary skill in the art will recognize there are numerous variations of the encrypt and decrypt dictionary attacks.

In split private key systems the user portion of the private key, referred to as $D_{aa}$ above, may come from the user's password only. Thus, a compromise of the password, i.e, another person learning a user's password, results in a compromise of the split private key system. Also, there still remains the possibility of a dictionary attack on the server portion of the private key, referred to as $D_{as}$ above, because the user portion of the private key comes from the user's password only. Thereby knowledge of $D_{as}$ enables a dictionary attack on Daa. Further, and as discussed above, existing multiple factor systems that overcome these problems rely upon expensive hardware. Because of this and other reasons, such systems have failed to gain support. Thus, there remains a need for a multifactor cryptographic system which overcomes the problems of the prior art.

OBJECTIVES OF THE INVENTION

It is an object of the present invention to provide a cryptosystem which overcomes the deficiencies of existing cryptosystems. Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the present invention, a method and a system for providing different levels of access based upon a same authentication factor are provided. An authentication factor can be any information upon which the identity of a user can be verified. The system includes a communications interface and a processor. The communications interface can be any type interface capable of exchanging information. The processor can be any type processor capable of functioning as described herein, including, but not limited to, a processor as found in a personal computer, a mainframe computer, a server computer, a PDA, a mobile phone, or a set top box.

A first message that is transformed with a first portion of a split private key is received. Message transformation with a portion of a split private key will be understood by one of ordinary skill in the art. A split private key is associated with an asymmetric key pair, which has a public key and the split private key. This first portion which has been used to transform the first message is based upon a user password and another factor. Thus, at least two factors are used to generate the first portion.

The user is authenticated for a first level of network access based upon the received first message being transformed with the first portion. That is, the portion of the split private key with which the first message has been transformed controls the level of network access granted the user. A level of network access can dictate information available via the network, can dictate the extent of access a user will be granted across the network, or can dictate any other aspect of network access desired.

A second message is received. This second message is transformed with a second portion of the split private key. This second portion is based upon the password only. Further, the second portion is not combinable with the first portion to complete the split private key. The user is authenticated for a second level of network access, different than the first level, based upon this second message being transformed with the second portion. Thus, a level of network access is dependent upon a portion of a split private key used to transform a message.

In one aspect, the first message is received from a first network station, and the other factor is stored at that network station. The second message is received from a second network station at which the other factor is not stored. Thus, in this aspect, a user is granted a different level of access dependent upon the network location which the user is using.

In another aspect, to determine that the first message is transformed with the first portion, the received first message is transformed with a third portion of the split private key, the public key of the asymmetric key, and at least one other public key. And, to determine that the second message is transformed with the second portion, the received second message is transformed with only a fourth portion of the split private key and the public key of the asymmetric key pair.

According to still another aspect, the asymmetric key pair is a first asymmetric key pair, and the first portion is based upon three factors. The three factors are the password, a private key of another asymmetric key pair, and still another private key of still another asymmetric key pair.

BEST MODE FOR CARRYING OUT THE INVENTION

Figure 1:
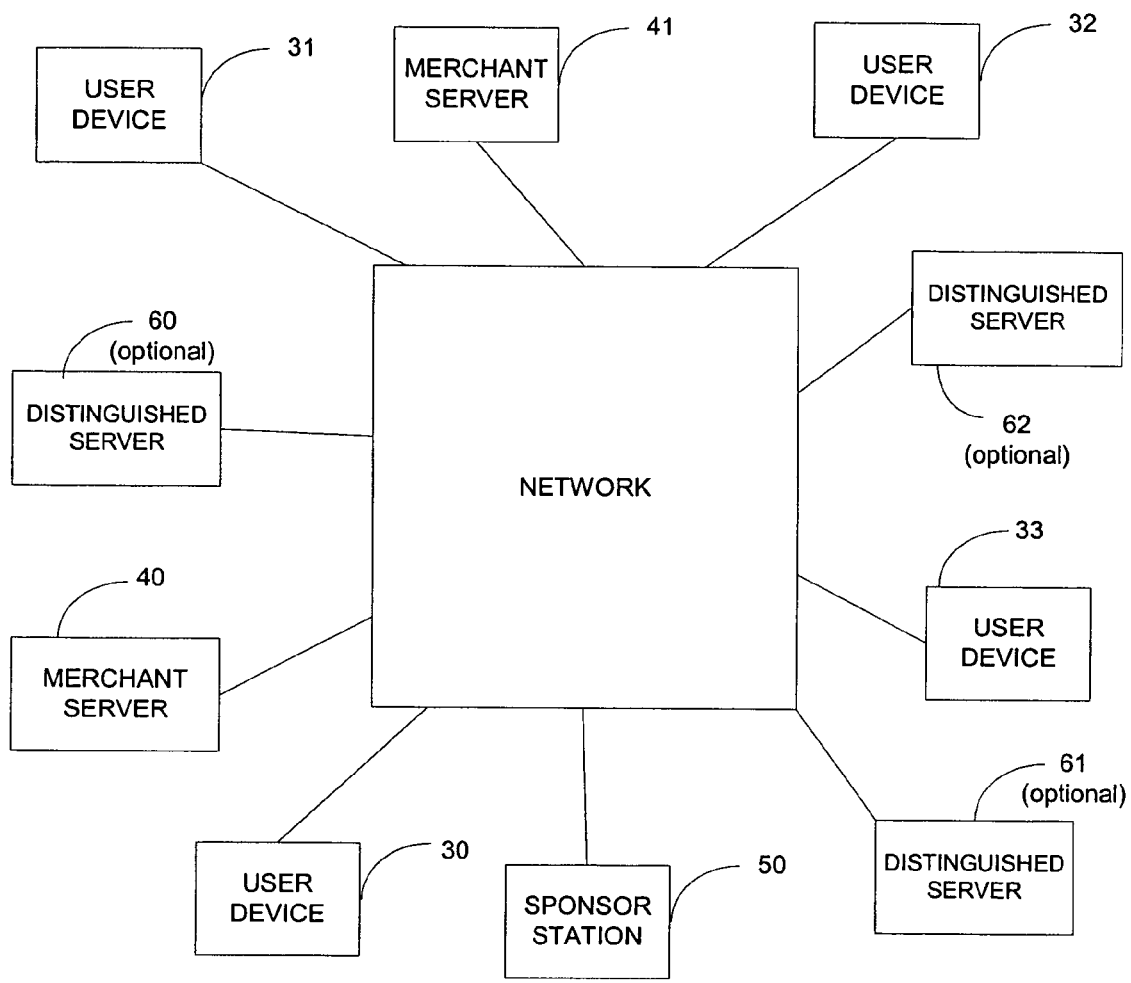
FIG. 1 depicts an exemplary network of the present invention, including networked devices associated with a user, a sponsor, a merchant, and an optional distinguished server.

FIG. 1 illustrates a network 10, which could be the Internet. As shown, the network 10 is an interconnection of networked devices in communication with each other. These networked devices include networked devices 30-33 associated with individual network users, networked devices 40-41 associated with merchant network users, a sponsor station 50 associated with a sponsor, and optional networked devices 60-62 associated with entities known to and trusted by the sponsor.

Networked devices 30-33 will be referred to as user devices. These network devices are typically personal computers, but could be other type network devices. Networked devices 40-41 will be referred to as merchant servers. It should be understood that merchant servers 40-41 could be associated with any type entity having a presence on network 10. Optional networked devices 60-62 will be referred to as distinguished servers. It will be understood that a network may consist of more networked devices than depicted in FIG. 1.

Figure 2:
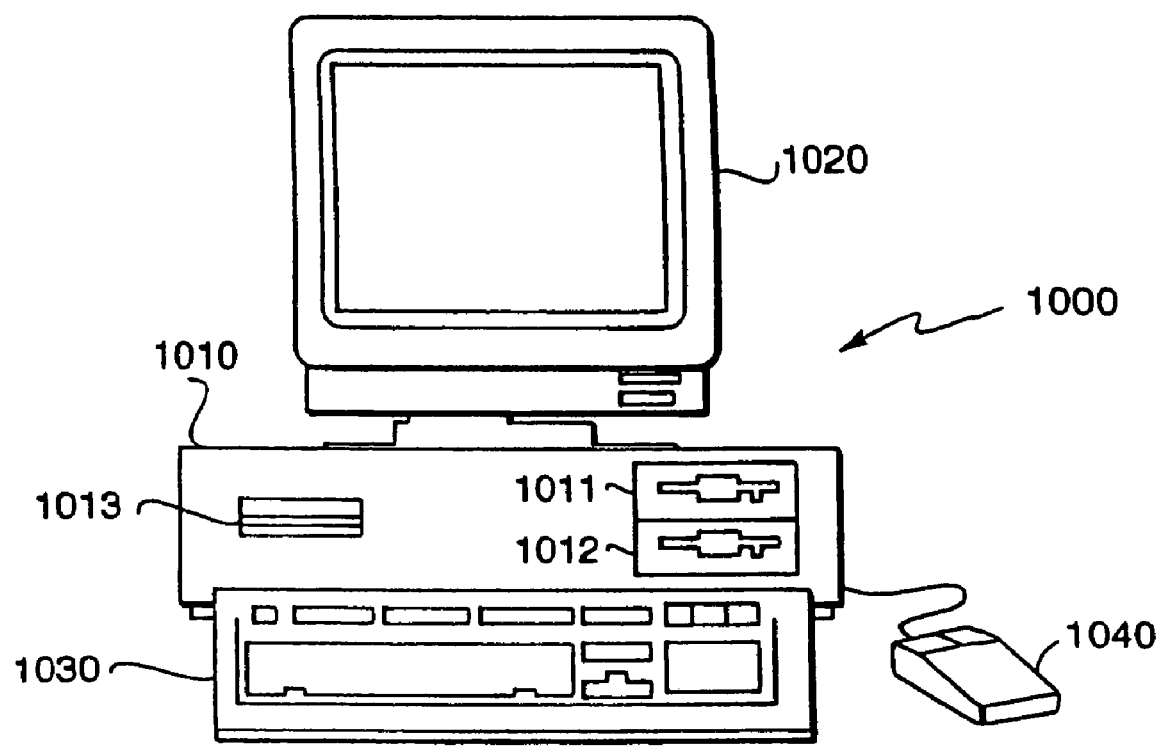
FIG. 2 depicts a computer suitable for use by a user to access a network in accordance with the invention.
Figure 3:
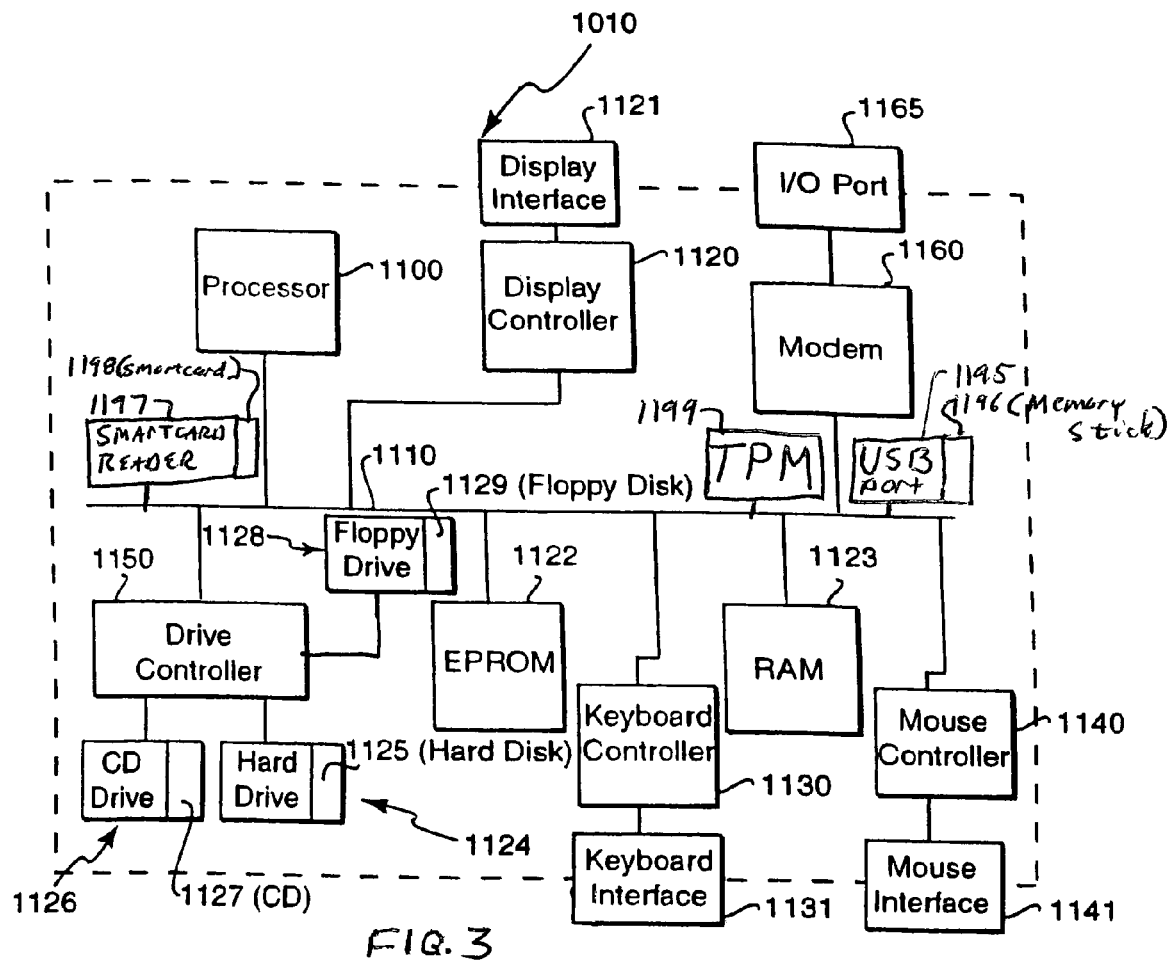
FIG. 3 is an exemplary block diagram of components of the computer depicted in FIG. 2.

FIGS. 2 and 3 depict an exemplary personal computer (PC) suitable for use by an individual user as a user device 30-33 to access the network 10. The PC is preferably a commercially available personal computer. It will be recognized that the PC configuration is exemplary in that other components (not shown) could be added or substituted for those depicted, and certain of the depicted components could be eliminated if desired. Further, a user device 30-33 could be another type device other than a 'computer', such as, but not limited to, a PDA or a mobile phone.

The computer functions in accordance with stored programming instructions which drive its operation. Preferably, the computer stores its programming instructions on an EPROM, or hard disk. It will be recognized that only routine programming is required to implement the instructions required to drive the computer to operate in accordance with the invention, as described below. Further, since the computer components and configuration are conventional, routine operations performed by depicted components will generally not be described, such operations being well understood in the art.

Referring to FIG. 2, the computer 1000 includes a main unit 1010 with slots 1011, 1012, and 1013, respectively provided for loading programming or data from floppy disk, compact disk (CD), or other removable media, onto the computer 1000. The computer 1000 also includes a keyboard 1030 and mouse 1040 which serve as user input devices. A display monitor 1020 is also provided to visually communicate information to the user.

As depicted in FIG. 3, the computer 1000 has a main processor 1100 which is interconnected via bus 1110 with various remote or local storage devices which may include, but are not limited to, EPROM 1122, RAM 1123, hard drive 1124, which has an associated hard disk 1125, CD drive 1126, which has an associated CD 1127, floppy drive 1128, which has an associated floppy disk 1129, USB port 1195 for connecting a USB drive 1196 (often called a flash drive), smart card reader 1197 for communicating with a smart card 1198. Also shown in FIG. 3 is a trusted processing module (TPM) 1199 for securely storing cryptographic keys. Taken together, the remote and local storage will be referred to collectively as 1170. A drive controller 1150 controls the hard drive 1124, CD drive 1126 and floppy drive 1128. Also depicted in FIG. 3 is a display controller 1120 interconnected to display interface 1121, a keyboard controller 1130 interconnected to keyboard interface 1131, a mouse controller 1140 interconnected to mouse interface 1141 and a modem 1160 interconnected to I/O port 1165, all of which are connected to the bus 1110. The modem 1160 and interconnected I/O port 1165 are used to transmit and receive signals via the network 10 as described below. It will be understood that other components may be connected if desired to the bus 1110, or that less than all the components shown in FIG. 3 May be connected to the bus 1110. By accessing the stored computer programming, the processor 1100 is driven to operate in accordance with the present invention.

The sponsor station 50, the merchant users and the optional distinguished entities are preferably represented on network 10 by an Internet server of the applicable type shown in FIGS. 4 and 5, as will be described further below. However, here again, any network compatible device which is capable of functioning in the described manner could be substituted for the servers shown in FIGS. 4 and 5.

Figure 4:
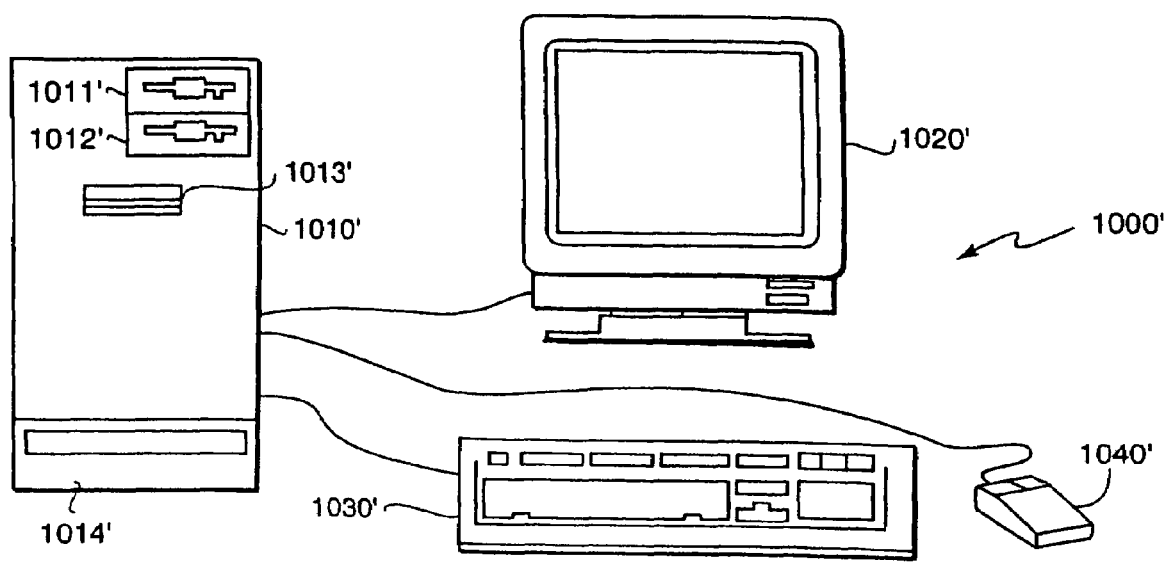
FIG. 4 depicts a server suitable for use by the sponsor station, optional distinguished entities, and merchants in accordance with the present invention.
Figure 5:
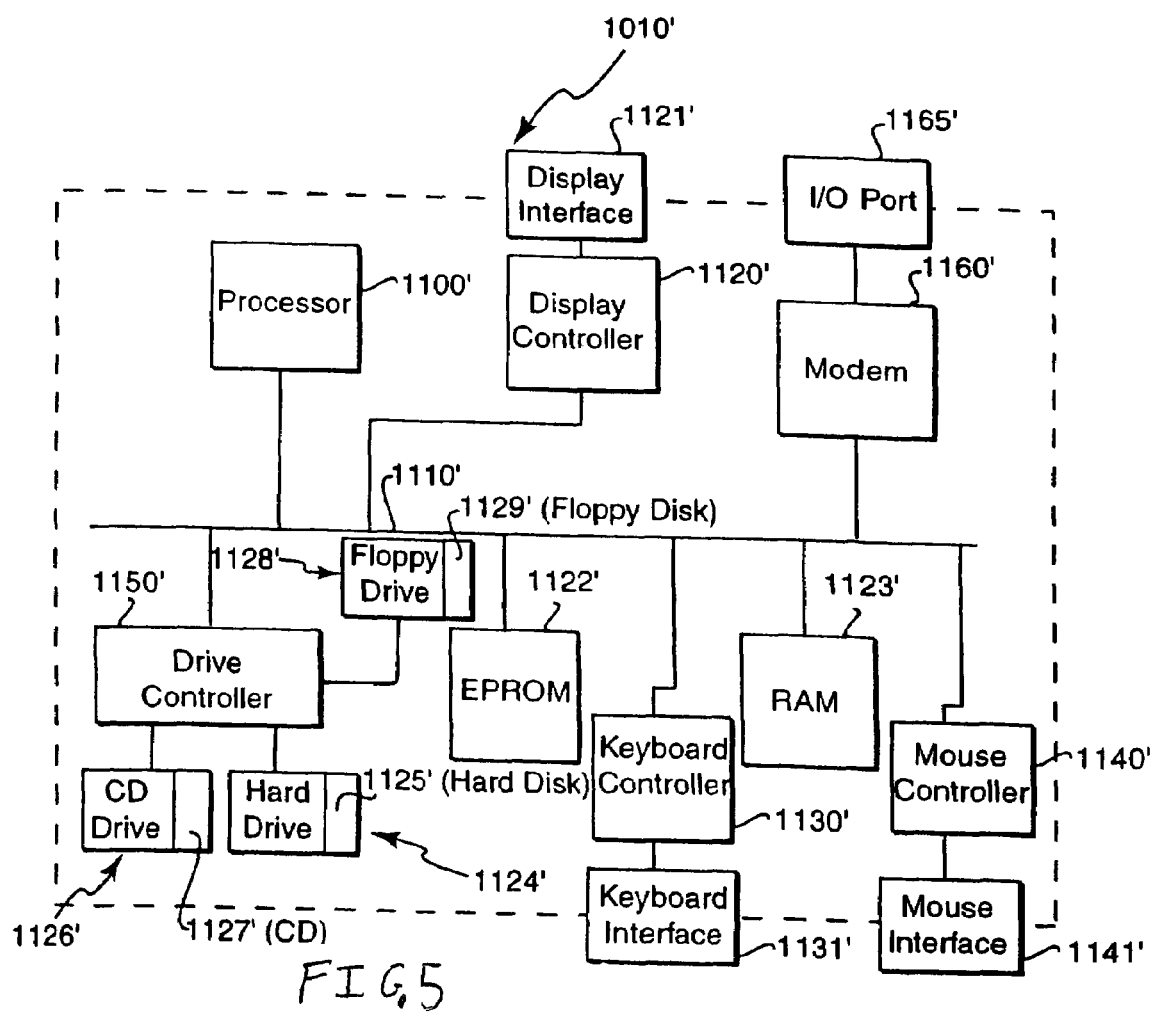
FIG. 5 is an exemplary block diagram of components of the server depicted in FIG. 4.

FIGS. 4 and 5 depict an exemplary network server suitable for use by the sponsor, merchants, and optional distinguished entities to access the network 10 in the below-described invention. The server is preferably a commercially available high power, mini-computer or mainframe computer. Here again, it will be recognized that the server configuration is exemplary in that other components (not shown) could be added or substituted for those depicted and certain of the depicted components could be eliminated if desired.

The server functions as described below in accordance with stored programming instructions which drive its operation. Preferably, the server stores its unique programming instructions on an EPROM or hard disk. It will be recognized that only routine programming is required to implement the instructions required to drive the server to operate in accordance with the invention, as described below. Further, since the server components and configuration are conventional, routine operations performed by depicted components will generally not be described, such operations being well understood in the art.

Referring to FIG. 4, the server 1000' includes a main unit 1010' with slots 1011', 1012', 1013' and 1014', respectively provided for loading programming or data from a floppy disk, CD and/or hard disk onto the server 1000'. The server 1000' also includes a keyboard 1030' and mouse 1040', which serve as user input devices. A display monitor 1020' is also provided to visually communicate information to the user.

As depicted in FIG. 5, the server 1000' has a main processor 1100' which is interconnected via bus 1110' with various storage devices including EPROM 1122', RAM 1123', hard drive 1124', which has an associated hard disk 1125', CD drive 1126', which has an associated CD 1127', and floppy drive 1128', which has an associated floppy disk 1129'. The memories, disks and CD all serve as storage media on which computer programming or data can be stored for access by the processor 1100'. The stored data includes one or more databases containing information associated with network users. The memories associated with a server hereafter will be collectively referred to as memory 1170'. A drive controller 1150' controls the hard drive 1124', CD drive 1126' and floppy drive 1128'. Also depicted in FIG. 11B is a display controller 1120' interconnected to display interface 1121', a keyboard controller 1130' interconnected to keyboard interface 1130', a mouse controller 1140' interconnected to mouse interface 1141' and a modem 1160' interconnected to I/O port 1165', all of which are connected to the bus 1110'. The modem 1160' and interconnected I/O port 1165' are used to transmit and receive signals via the network 10 as described above. It will be understood that other components may be connected if desired to the bus 1110'. By accessing the stored computer programming, the processor 1100' is driven to operate in accordance with the present invention.

Multifactor Asymmetric Crypto-Key

A multifactor asymmetric crypto-key is associated with at least each individual network user, and, if present, each optional distinguished server 60-62. If desired, a multifactor asymmetric crypto-key can also be associated with each merchant user. Each multifactor asymmetric crypto-key consists of two portions, a public portion and a private portion. The public portion is referred to as E, and the private portion is referred to as D. The public portion of each multifactor asymmetric crypto-key is known to at least each merchant user. If desired, the public portion of each multifactor asymmetric crypto-key can also be known to each individual user. Each of these public portions can be stored on each merchant server, or on each merchant server and each individual device, in association with a user id. Additionally, each E, or less than each E, can be stored at sponsor station 50. The private portion of each asymmetric crypto-key consists of at least a first private portion having multiple factors and a second private portion. The second private portion of each multifactor asymmetric crypto-key is retained by the sponsor station 50 and will be referred to as $D_2$. The first private portion of each multifactor asymmetric crypto-key will be referred to as $D_1$ and will be further discussed below.

The multifactor asymmetric crypto-keys are used in transforming information. Preferably, the multifactor asymmetric crypto-keys are used in providing trusted authentication of an individual user to a merchant user. Also, the multifactor asymmetric crypto-keys can be used in providing trusted authentication of an individual user to another individual user, or of a merchant user to another merchant user. Further the multifactor asymmetric crypto-keys can be used to decrypt data encrypted with the public key. More generally, some subset of the multifactor asymmetric crypto-keys can be used to sign (or likewise decrypt) a message and the signature verified (likewise message encrypted) by the remaining crypto-keys.

In accordance with the present invention $D_1$ is made up of at least two, and perhaps additional, factors. One factor which is preferably always present is a user's password. Another factor will be either a private key stored on a user device 30-33, or a private key stored elsewhere. Of course, both, instead of one, of the other factors could be utilized with the user password, as will be discussed in detail below. Sometimes a private key stored on a user device 30-33 will be referred to as $D_{tether}$ or a tether key, and a private key stored elsewhere will be referred to as $D_{USB}$.

Typically, the password will not be stored in any form, as preferably a password is short, and thus relatively easy for a user to memorize. However, as desired, a password could be stored on a user device 30-33, or even elsewhere. Introduced above, $D_{tether}$, when present, is stored on the user's device. In the most common implementation, $D_{tether}$ is stored securely on the hard disk 1125 using the protection capabilities provided by the PC's operating system, preferably as a non-exportable private key in a Windows Operating System keystore. Of course, as desired, $D_{tether}$ could be stored in a Windows Operating System registry. Alternatively, $D_{tether}$ can be, as desired, stored on the trusted processing module (TPM) 1199. No matter where or how on the user device 30-33 $D_{tether}$ is stored, in the most basic configuration, $D_{tether}$ can only be used from the user device 30-33 upon which it is stored. That is, $D_{tether}$ is a non-exportable private key stored on the user device upon which it will be used. However, as will be discussed in detail further below, $D_{tether}$ may be ported to other devices and used thereon.

Introduced above, $D_{USB}$ is not stored on the user device. $D_{USB}$ is stored on removable media such as, but not limited to, a USB drive (flash drive), a floppy disk, or a CD. Preferably $D_{USB}$ is stored on a USB flash drive. As desired $D_{USB}$ may be encrypted. Preferably, such an encryption is not performed with the user's password. However, $D_{USB}$ could be, as desired, encrypted with $D_{tether}$. In addition to the removable media described above, $D_{USB}$ can be, as desired, stored on a smart card, which is a more sophisticated form of removable memory which typically includes separate processing electronics.

Key Generation

In one preferred implementation of key generation the sponsor station 50 drives the association between users and multifactor asymmetric crypto-keys. Preferably, for a user to obtain an association with a multifactor asymmetric crypto-key, the user must have a relationship with an entity associated with an optional distinguished server 60-62 and only those users referred to the sponsor 50 by an optional distinguished server 60-62 are eligible to participate in network 10. However, as desired, distinguished servers 60-62 may not be included in the network 10. In such a case, some or all of the functions performed by an optional distinguished server 60-62, including those described herein, could be performed by sponsor 50, and/or some or all of the functions performed by an optional distinguished server 60-62 might not be performed.

For the sake of discussion below, it is assumed that one or more optional distinguished servers 60-62 are included in network 10. If an individual user associated with user device 31 wishes to obtain an association with a multifactor asymmetric crypto-key, yet does not have a preexisting relationship with any distinguished server 60-62, that user may choose to contact distinguished server 60 via the network 10 and provide identity information to the distinguished server 60. In this case, the distinguished server 60 has the capabilities to verify identity information. This capability may be any well known method of verifying identify information, such as a database of credit information, a database of telephone account information, or a database of address information. If the distinguished server 60 verifies the provided information, the distinguished server 60 can refer the user to the sponsor station 50.

If an individual user associated with user device 33 wishes to obtain an association with a multifactor asymmetric crypto-key and has a relationship with the distinguished server 61, the individual user must request that the distinguished server 61 initiate the process of associating an asymmetric crypto-key with the individual user. Operations as described below and depicted in FIGS. 6a-6c will be performed.

Figure 6A:
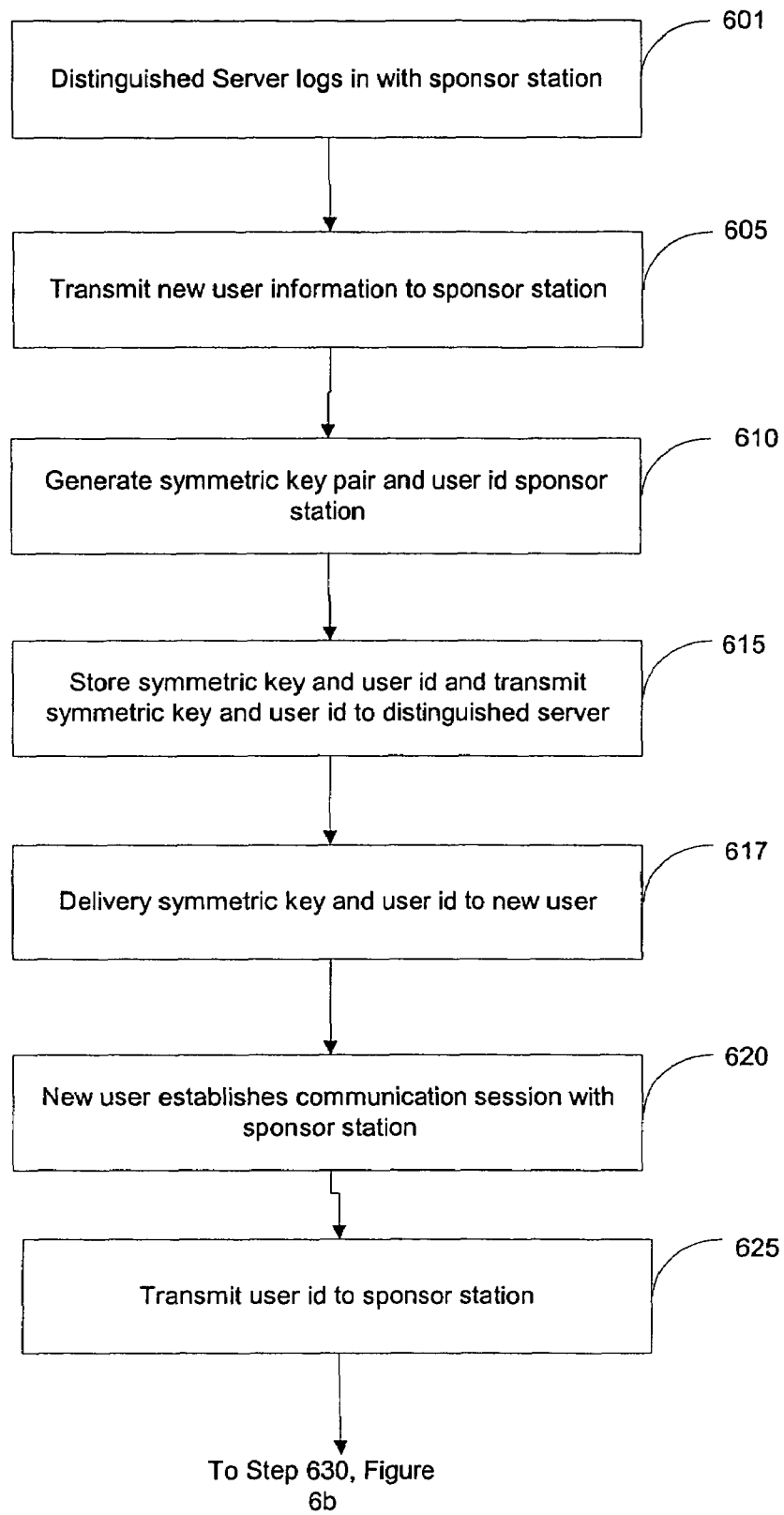
FIGS. 6a-6c is a flow chart showing operations which are performed by a user a optional distinguished server and sponsor station in associating a multifactor asymmetric key pair with the user in accordance with certain aspects of the present invention.

As shown in step 601 of FIG. 6a, a distinguished server 60-62, in this instance distinguished server 62, logs in with the sponsor station 50. Then, the distinguished server 62 transmits to the sponsor station 50 information identifying a new user with whom a multifactor asymmetric crypto-key will be associated, in this instance the individual user associated with user device 33, step 605. The sponsor 50 then generates a symmetric key pair and a user ID which will be associated with the new user, step 610. This symmetric key pair will serve as a one time activation code. Preferably, the symmetric key/one time activation code is a short pronounceable word. This symmetric key/one time activation code and user ID is stored in the memory 1170' and is also transmitted to the distinguished server 62, step 615. The distinguished server 62 then causes the symmetric key/one time activation code and user ID to be delivered to the new user. This delivery may be via traditional postal delivery, via e-mail, or via other electronic delivery, such as via a web-page, step 617. Preferably electronic or hard-copy delivery will be secured using techniques familiar to those skilled in the art.

The new user, after receiving the user ID and symmetric key/one time activation code, establishes a communication session with the sponsor 50 via network 10, step 620. The new user enters the user ID into his or her user device and transmits the same to the sponsor station 50 via the network 10, step 625. The sponsor 50 matches the received user ID with the user ID and symmetric key stored in memory 1170', step 630.

If the received user ID has a match stored in memory 1170', the sponsor 50 generates a challenge and encrypts the challenge with the symmetric key/one time activation code, step 635. The sponsor 50 transmits the encrypted challenge to the user device 33, step 638. The user device 33 decrypts the challenge using the new user's symmetric key/one time activation code, step 640. At step 645, the user device 33 transmits either the decrypted challenge, or proof of possession thereof, to sponsor 50 to authenticate the user to the sponsor. At this point, the user is eligible to be associated with a multifactor asymmetric crypto-key.

In an alternative embodiment, the sponsor station 50 and an optional distinguished server 60-62 do not participate in key generation. Rather, key generation is between a user device 30-33 and a merchant server 40-41. In such a case, as desired, conventional processing for a user to authenticate to a server may be utilized.

The generation of the multifactor asymmetric crypto-key begins at step 650 in which the user device 33 generates two asymmetric key pairs. The first key pair is $D_{tether}$ and $E_{tether}$, along with $N_{tether}$. $E_{tether}$ is the corresponding public key to the private key $D_{tether}$ and $N_{tether}$ is the modulus. The second key pair is $D_{USB}$ and $E_{USB}$, along with $N_{USB}$. $E_{USB}$ is the corresponding public key to the private key $D_{USB}$. Introduced above, $D_{tether}$ is stored on the user device 33, and $D_{USB}$ is stored on removable media. At step 655 the user device 33 transmits the non-private portions of the generated keys, i.e., $E_{tether}$, $N_{tether}$, $E_{USB}$, and $N_{USB}$, to sponsor 50 via network 10 for storage. It should be appreciated that this transmission could be broken into multiple transmissions, as well as could be encrypted with the symmetric key/one time activation code, or even another key.

Figure 6B:
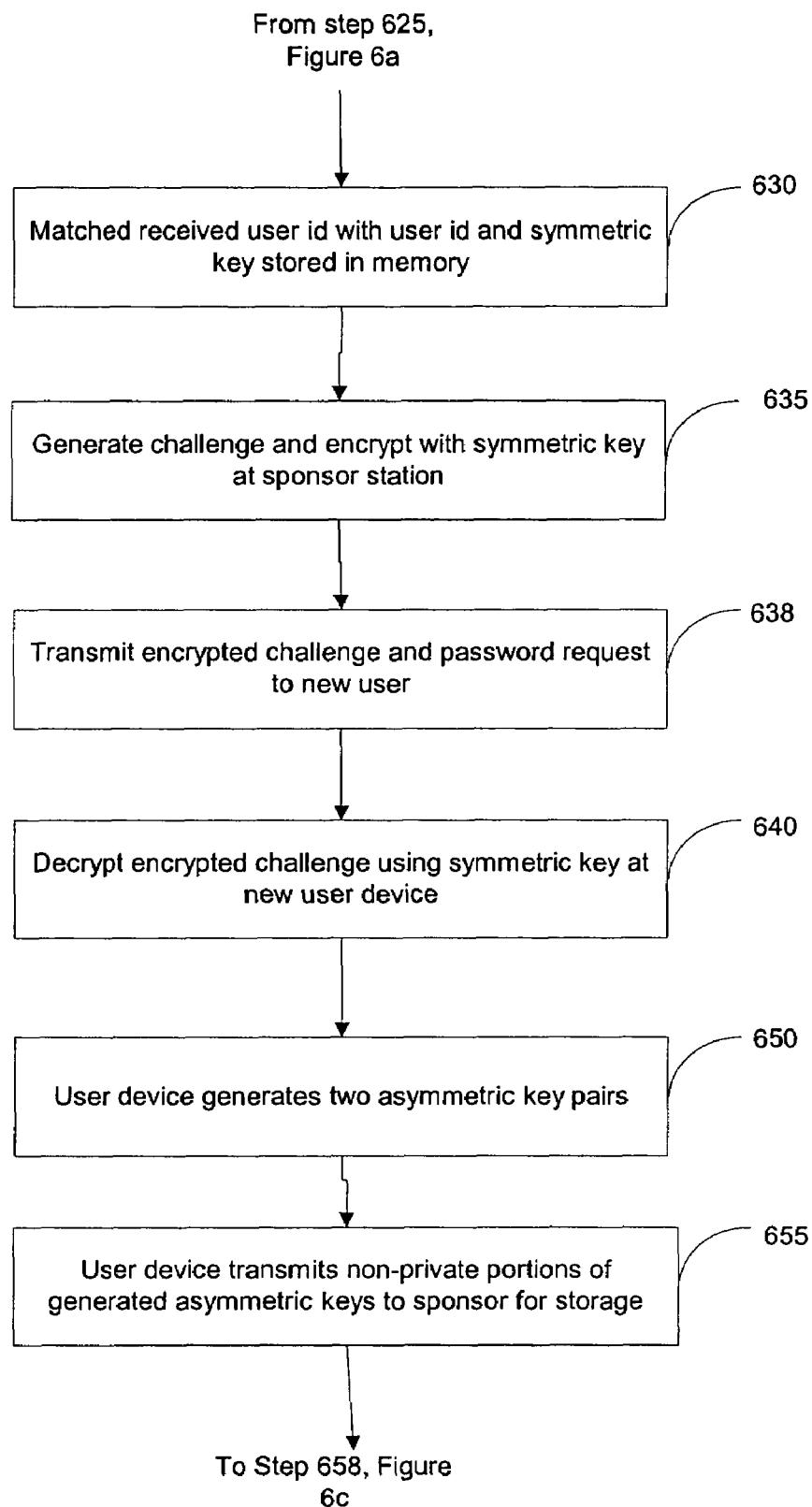
Figure 6C:
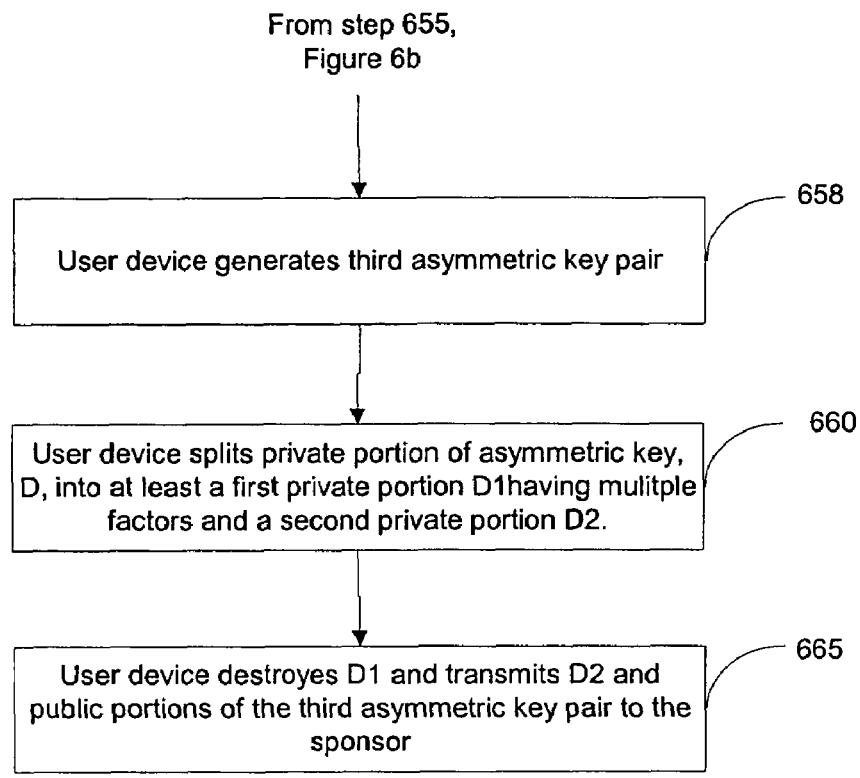

At step 658 of FIG. 6b the user device 33 generates a third asymmetric key pair, D and E, along with N. E is the public portion of the multifactor asymmetric crypto key, with N being the modulus. Following at step 660, the user device 33 splits D into at least a first private portion, $D_1$, having multiple factors, and a second private portion $D_2$. The user device 33 first determines $D_1$, as will be described below, and then determines $D_2$ utilizing conventional techniques, as will be understood by one of ordinary skill in the art, i.e. that $D_1 * D_2 = D \bmod F (N)$.

The processing to determine $D_1$ is based upon the multiple factors. In the preferred embodiment, the multiple factors are a user password, $D_{tether}$, and $D_{usb}$. However, as desired, the multiple factors could be any two of $D_{tether}$, $D_{USB}$, and the user password. In particular, the user device 33 calculates $D_1$ utilizing the PKCS-5 algorithm, a well known one way function. The preferred equation for $D_1$ is as follows:

PKCS-5 (sign {Sha-1 (sign {Sha-1(password), $D_{tether}$}), $D_{USB}$}, salt, iteration count)     (1)

Thus, as shown in equation 1, $D_1$ is computed in a novel manner by taking a first Sha-1 hash of the password and transforming this quantity with $D_{tether}$, taking a second Sha-1 hash of the transformed quantity and transforming the second Sha-1 hash with $D_{USB}$, and then using the result of this second transformation as an input to the PKCS-5 algorithm, along with the salt and the iteration count. After the determination of $D_1$, the user device 33 determines $D_2$ utilizing conventional and well known techniques, completing the split of $D_1$.

For those cases in which it is desired to use the password and $D_{USB}$ as the multiple factors, but not $D_{tether}$, the following equation for determining $D_1$ can be used:

PKCS-5 (sign {Sha-1 (password), $D_{USB}$}, salt, iteration count)     (2)

For those cases in which it is desired to use the password and $D_{tether}$ as the multiple factors, but not $D_{USB}$, the following equation for determining $D_1$ can be used:

PKCS-5 (sign {Sha-1 (password), $D_{tether}$}, salt, iteration count)     (3)

After the user device 33 determines $D_1$, operations continue with step 665 in which the user device 33 destroys $D_1$ and transmits $D_2$, E and N to the entity with which the user is establishing a multifactor asymmetric crypto-key, which could be the sponsor station 50 or a merchant server 40-41, for storage in memory 1170'. Thereafter the user device 33 destroys D2. Preferably, at least the transmitted $D_2$ is encrypted with the symmetric key/one time activation code, or even another key. Of course, as desired, either or both of E and N could also be encrypted.

Alternatively, as desired, the key association entity, i.e., for example, sponsor 50, or merchant server 40-41, could generate one or more of the first, second, or third key pairs, including the splitting of $D_1$. If an entity other than a user device 33 generates either the first or the second key pair, that generating entity will transmit the generated private portion, i.e., $D_{tether}$ and/or $D_{USB}$, to the user device 33 and destroy the copy at the other entity 50 so that only the user, through the user device 33 or removable media, has access to a private portion of either of these key pairs. If another entity generates the third key pair and performs the splitting, that generating entity does not provide any associated information to the user. However, preferably the user will provide the password to the generating entity for use with the PKCS-5 algorithm. Also, the non-user device having generated $D_1$ and $D_2$ destroys $D_1$ and the password and stores $D_2$ in memory 1170'.

Login Protocol—One to One

Figure 7A:
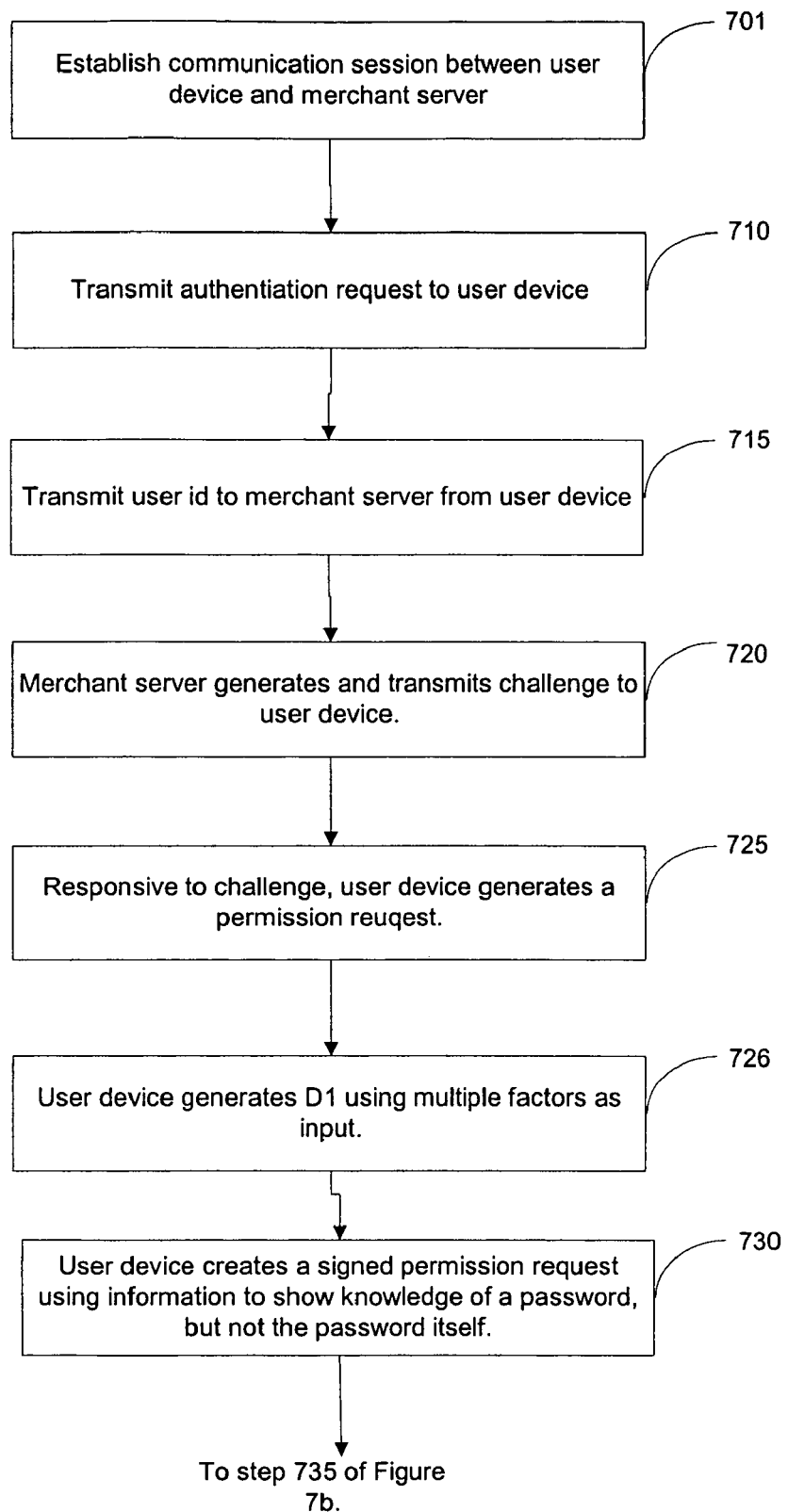
FIGS. 7a-7b is a flow chart showing operations which are performed by a user device and merchant server for a user to authenticate himself or herself to a server in accordance with certain aspects of the present invention.
Figure 7B:
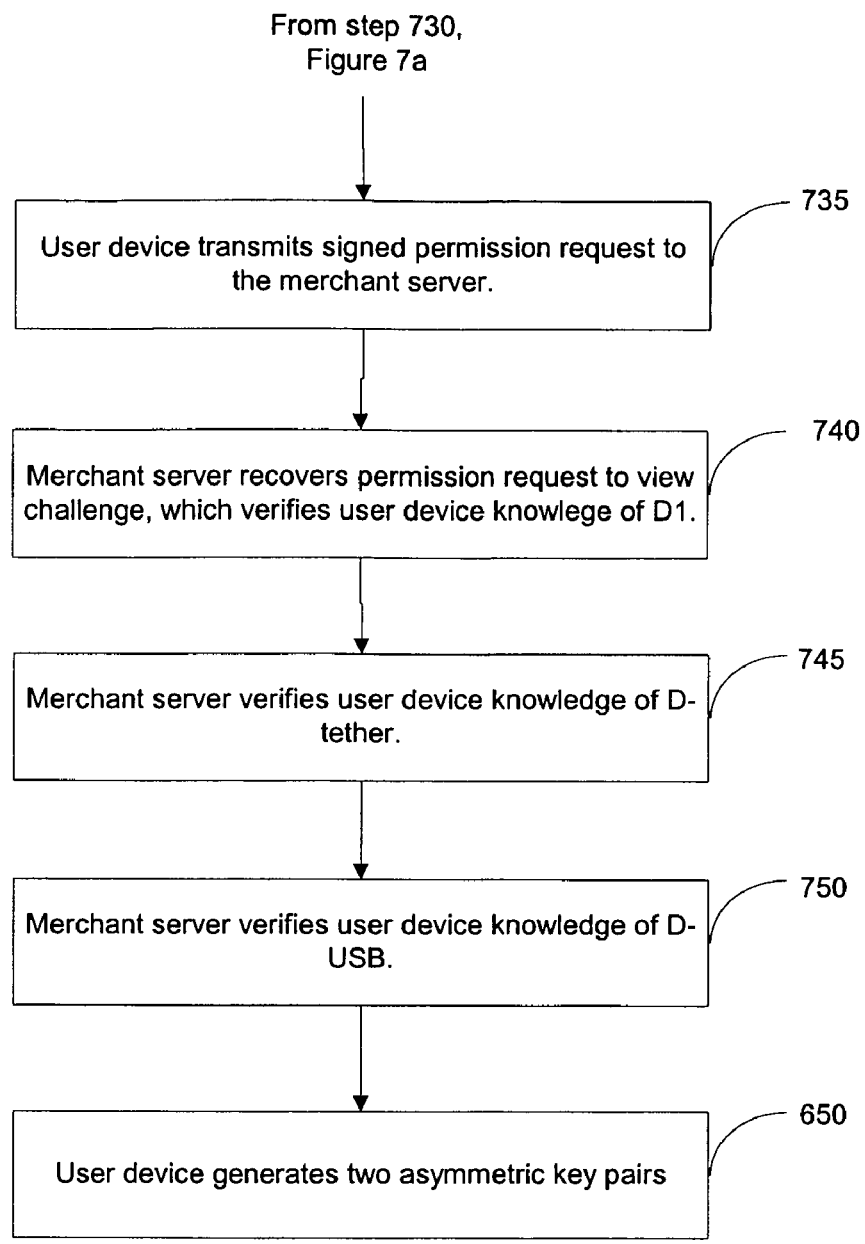

In providing trusted authentication of an individual user, in this instance, the individual user associated with user device 30, to an entity which the user directly obtained a multifactor asymmetric crypto-key, in this instance, the merchant user associated with merchant server 40, the following operations, as shown in FIGS. 7a and 7b, are performed by networked devices 30 and 40. For simplicity of the description, it is assumed here that the merchant server 40 also functioned as the sponsor server 50 in the previously described key generation protocol, although more generally they can be different network devices. This authentication is known as the LOGIN ONE TO ONE protocol.

A communication session between user device 30 and merchant server via network 10 is established, step 701 of FIG. 7. Merchant server 40 transmits a request via network 10 to user device 30 requesting that the individual user authenticate himself or herself to the merchant user, step 710. At step 715 the user transmits his or her user ID to the merchant server 40 via network 10 in the clear. It should be understood that, as desired, communications between the user device 30 and the merchant server could be protected using server side SSL encryption. However, for the sake of simplicity, it will be assumed that, in the present example, server side SSL is not used.

Next, at step 720 the merchant server 40 generates a challenge, which consists of a random number and a time stamp, and transmits the same to the user device 30 via the network 10, also in the clear. In response to the challenge, the user device 30, at step 725, generates a permission request (PR) which consists of the challenge, a time stamp, and a random number R1. In order to authenticate the user to the merchant server 40, the user will demonstrate knowledge of $D_1$, $D_{tether}$, and $D_{USB}$. However, the user device 30 will not provide the password to the merchant server 40. At step 726, the user device 30 generates $D_1$, using the PKCS-5 algorithm resident on the user device 30, as described above. In other words, the user enters his or her password and makes the removable media upon which $D_{USB}$ is stored available to user device 30. As will be understood from the above, $D_{tether}$ is already stored on the user device 30. It should be understood that steps 725 and 726 could be concurrently performed, or could be performed in some other order than that depicted in the Figures and as described herein.

At step 730 the user device 30 creates a signed permission request (SPR) using $D_1$, $D_{tether}$, and $D_{USB}$. The signed permission request has the following form:

$$SPR = (PR, \text{sign}(Sha\text{-}1(PR), D_{tether}, \text{sign}(Sha\text{-}1(PR), D_{USB})^{D1} \quad (4)$$

Thus, PR is combined with both a Sha-1 hash of PR signed with $D_{tether}$ and a Sha-1 hash of PR signed with $D_{USB}$. This combination is then encrypted with $D_1$. At step 735 the user device 30 transmits SPR to the merchant server 40 via network 10.

Upon receipt of SPR, the merchant server 40 uses $D_2$, N and E, stored in memory 1170', to recover PR, sign (Sha-1 (PR), $D_{tether}$), and sign (Sha-1 (PR), $D_{USB}$) by removing $D_1$. step 740. Verifying that the challenge included in PR is correct, after decrypting with $D_2$, verifies knowledge of $D_1$. At step 745 the merchant server 40 uses $E_{tether}$ and $N_{tether}$ to directly verify knowledge of $D_{tether}$. That is, the merchant server 40 recovers PR from sign (Sha-1 (PR), $D_{tether}$). And, at step 750 the merchant server 40 uses $E_{USB}$ and $N_{USB}$ to directly verify knowledge of $D_{USB}$. That is, the merchant server 40 recovers PR from sign (Sha-1 (PR), $D_{USB}$). The successful completion of steps 740 through step 750 implicitly verifies knowledge of the password and associated multiple factors used to correctly construct $D_1$, as well as additional direct verification of these multiple factors, thus providing successful authentication. One or more of these direct additional verifications may be omitted as desired.

Following step 750, assuming successful authentication, the merchant server 50 and the user device 30 work together to create a symmetric crypto-key used to encrypt and MAC communications between the two. Creation and use of such a symmetric crypto-key is well known in the art and will be understood by one of ordinary skill.

Login Protocol—Single Sign on

Single sign on capabilities are easily provided within the context of a multiple factor asymmetric crypto-key. That is, a user enters his or her password once to access one website and is not asked for the same when accessing another website, or different portion of the one website. To provide single sign on, in one embodiment after generation during login, $D_1$, is stored encrypted on the user device 30, with the key for decryption stored on the sponsor server 50. $D_1$ could be stored on the hard disk in a location such as the Windows registry where it can be accessed by multiple programs. However, this makes the encrypted key vulnerable to theft, so another alternative is to store the encrypted key in a shared area of RAM. $D_1$, when stored in RAM, can also be encrypted with a non-exportable one time use RSA key pair that has a lifetime of that particular encrypted copy of $D_1$, or encrypted with a smartcard key. Yet another possibility is to store $D_1$ in the TPM 1199, either directly in the TPM or external to the TPM encrypted with one of the private keys of the TPM 1199.

Figure 8A:
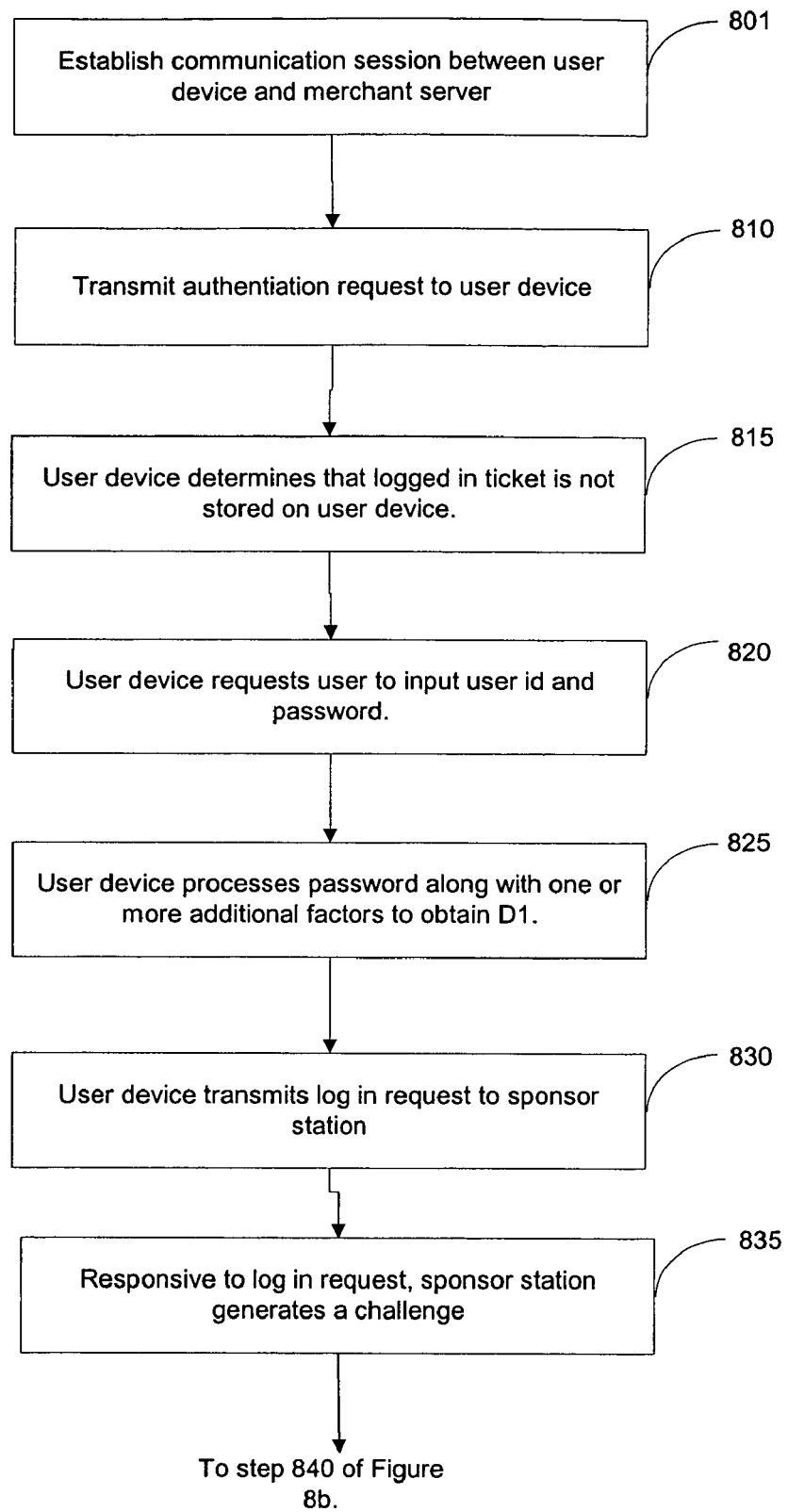
FIGS. 8a-8c is a flow chart showing operations which are performed by a user device and the sponsor station for a user to log himself or herself onto a server in accordance with certain other aspects of the present invention.
Figure 8B:
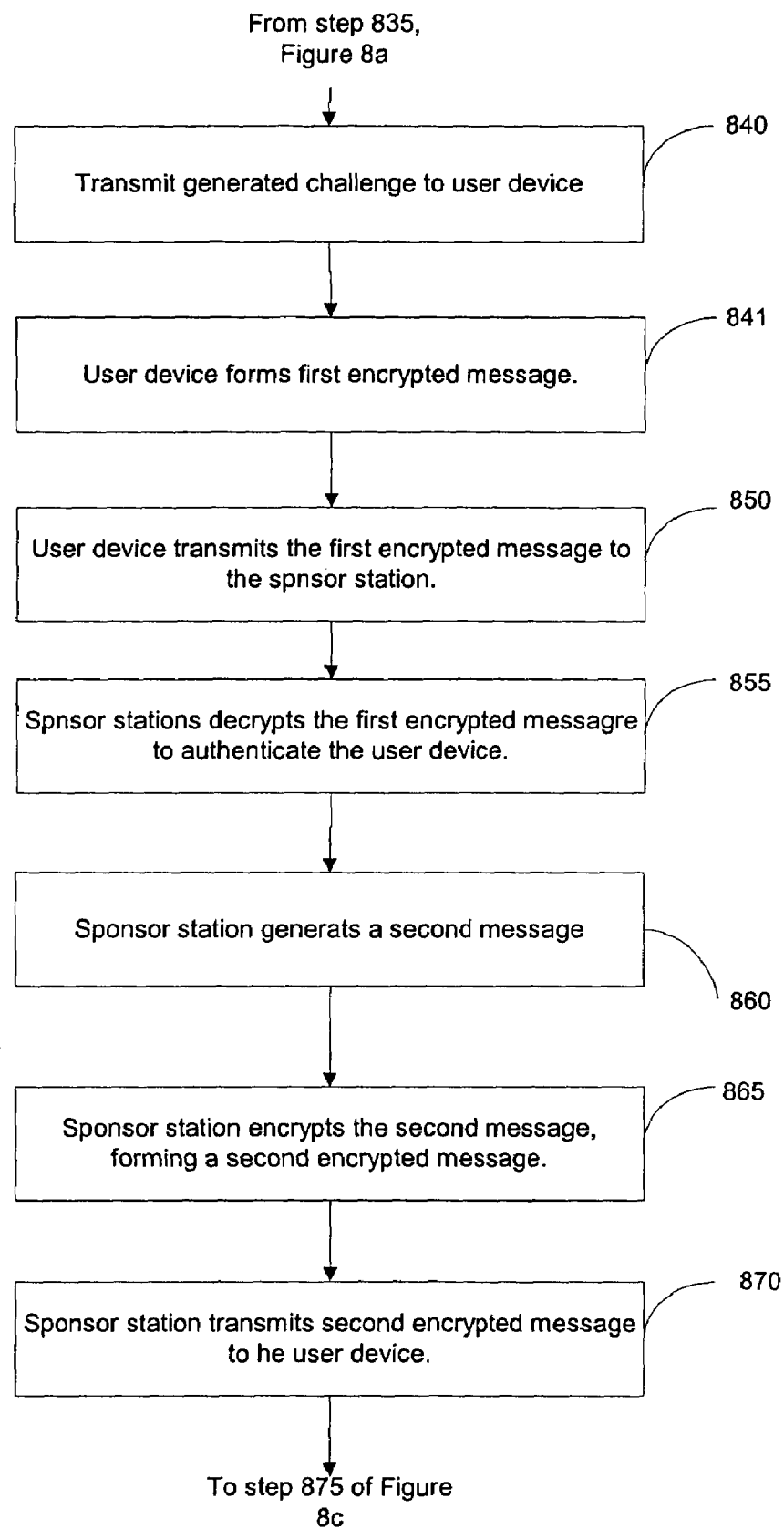
Figure 8C:
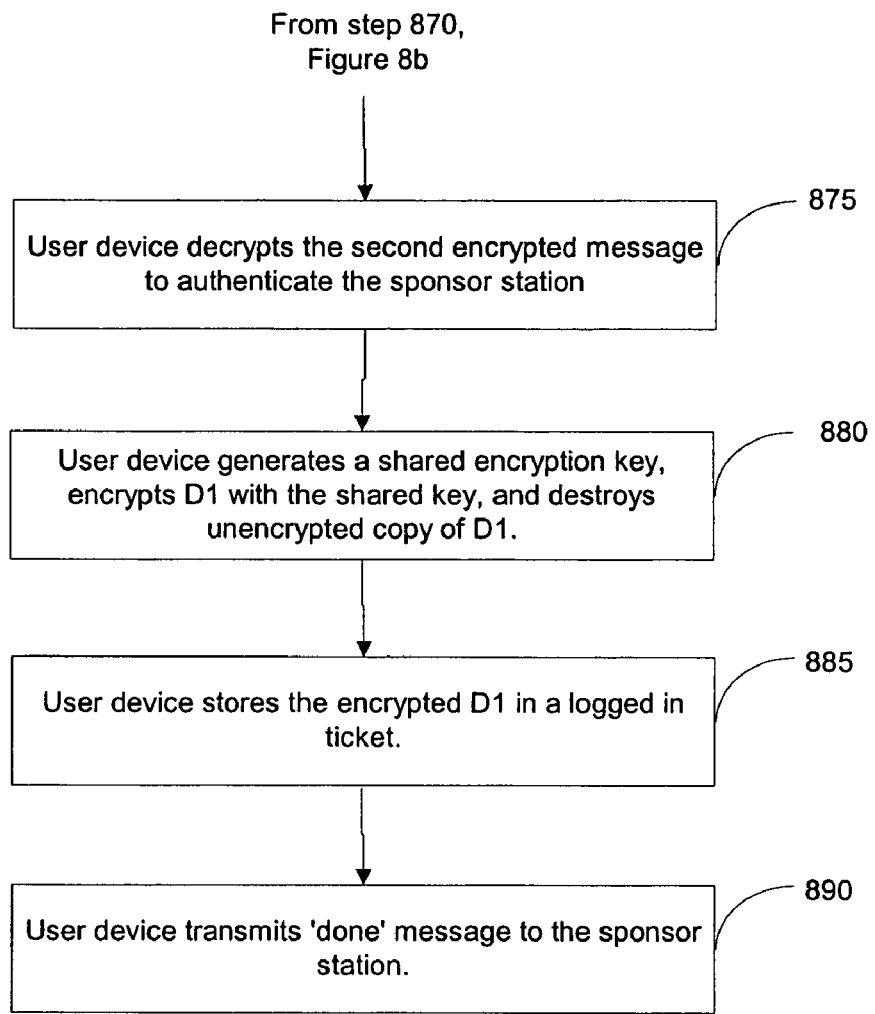

In another single sign on embodiment, the sponsor station 50 participates in the login protocol. With reference to FIG. 8, a communication session between user device 30 and merchant server via network 10 is established, step 801. Merchant server 40 transmits a request via network 10 to user device 30 requesting that the individual user authenticate himself or herself to the merchant user, step 810.

In response to this request, the user device 30 determines if a logged-in ticket is stored on memory 1170 at the user device 30, step 815. For purposes of the present discussion it will be assumed that a logged-in ticket is not stored. The user device 30 requests the individual user to enter his or her user id and password into the user device 30, step 820.

User device 30 processes the entered password along with $D_{tether}$ and $D_{USB}$ to obtain $D_1$, step 825. User device 30 then transmits a log-in request to sponsor station 50 via network 10, step 830. The log-in request includes at least the user's user ID. It should be understood that step 825 can occur previous to step 830, concurrent with step 830, or subsequent to step 830, though it is shown previous to step 830 in FIG. 8.

Sponsor station 50 receives and processes the log-in request to generate a challenge to the user device 30, step 835. The generated challenge is transmitted to the user device 30 via network 10, step 840. The log-in request and challenge are preferably each transmitted in the clear. That is, neither of these messages are protected. However, as will be understood, server side SSL encryption could be, as desired, used to protect these communications.

The user device 30 receives the challenge and generates SPR, as will be understood from the discussion above and FIG. 7, forming a first encrypted message, step 841. User device 30 transmits the first message to sponsor station 50, step 850. Sponsor station 50 decrypts the first encrypted message, as also will be understood from the above, to recover PR, which includes the challenge, time stamp and R1, step 855. This operation authenticates the user device 30 to the sponsor station 50.

Upon successful authentication, the sponsor station 50 generates a second random number R2, computes the function XOR of R1 and R2, generates a time stamp, and determine a lifetime-value, step 860. The lifetime-value is the life span of the logged-in ticket. This value may be a finite time period, such as 1 hour or any other finite time period so desired, or this value may be an end time such that the logged-in ticket expires upon that time being reached. Next, the sponsor station 50 encrypts R2, the time stamp, and the lifetime-value with R1, forming a second encrypted message, step 865. The sponsor station 50 transmits this second encrypted message to the user device 30 via network 10, step 870.

The user device 30 decrypts the second encrypted message using R1, recovering R2, the time stamp, and the lifetime-value, step 875. This operation authenticates the sponsor station 50 to the user device 30. The user device 30 computes function XOR of R1 and R2 which is called R12, encrypts $D_1$ with R1, and then destroys R1 and the unencrypted $D_1$, step

880. The user device 30 then stores the encrypted $D_1$, user ID, time stamp, and the lifetime-value on memory 1170, or elsewhere on the user device 30, forming the logged-in ticket, step 885. The user device 30 then transmits a message to the sponsor station 50 which includes a 'done' indication and a time stamp which are encrypted using R12, step 890. The sponsor station 50 stores an indication in memory 1170' that the user is logged in. The user has now successfully logged in. If the user has an unexpired logged-in ticket, the user need not provide the user's client ID or password again to provide authentication to another network station requesting authentication.

Figure 9A:
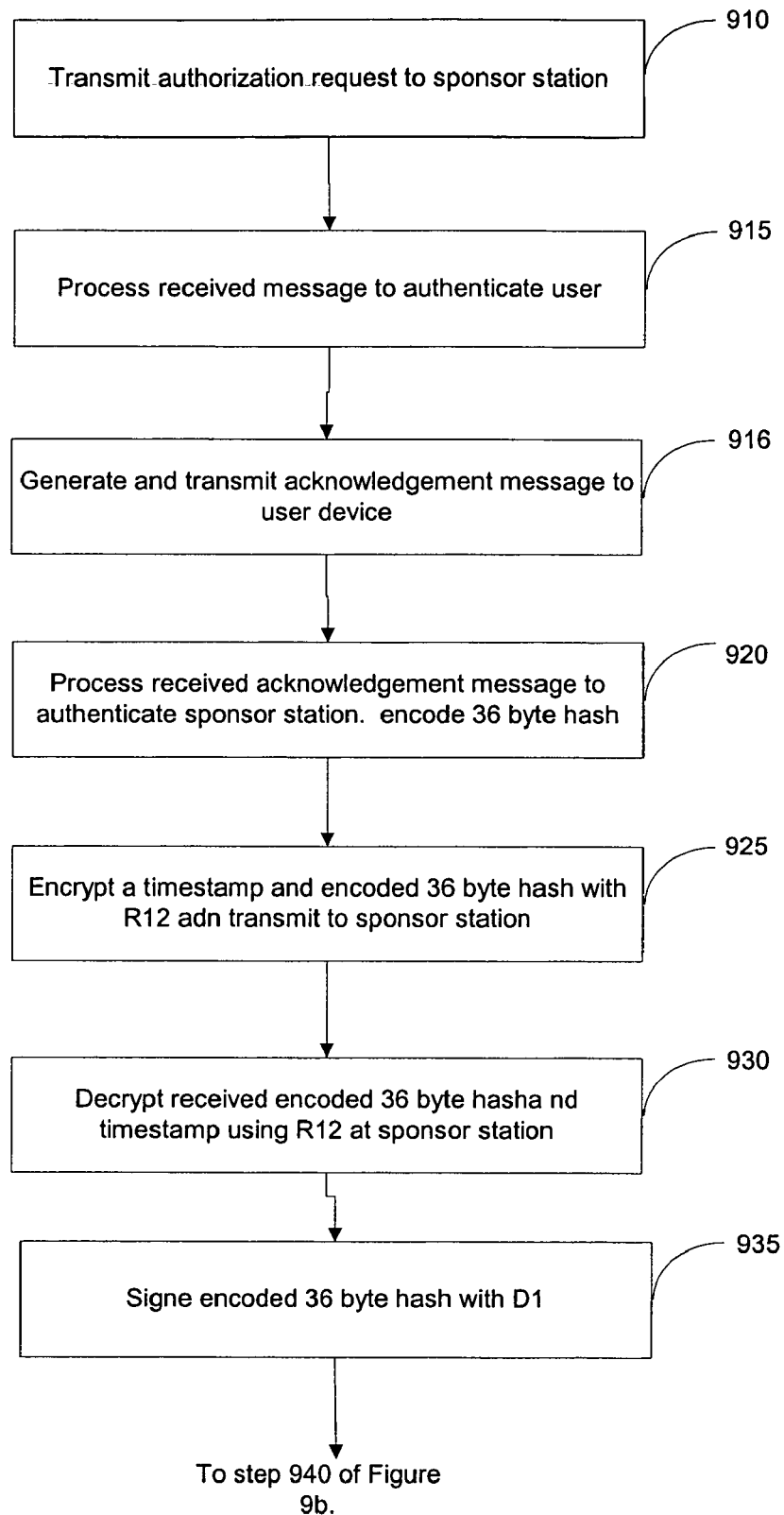
FIGS. 9a-9b is a flow chart showing operations which are performed by a user device and the sponsor station for a user to authenticate himself or herself subsequent to logging on in accordance with certain aspects of the present invention.
Figure 9B:
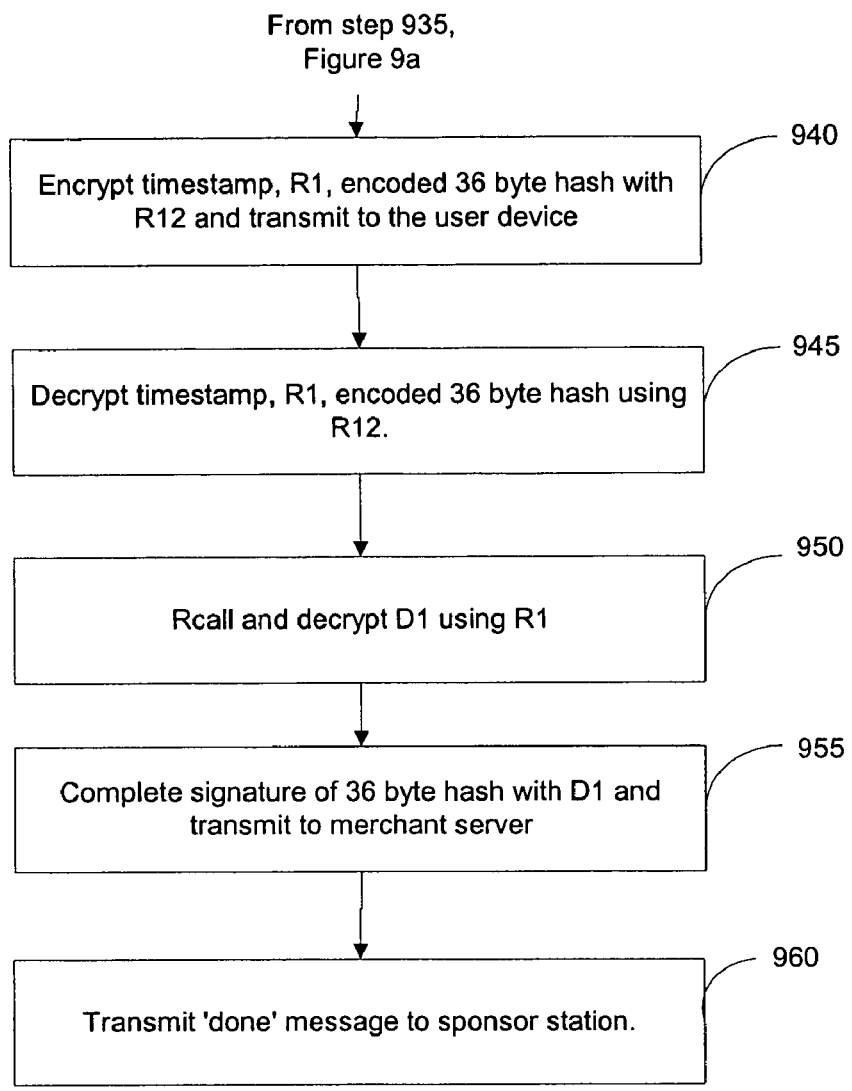

Once the user is successfully logged in, to complete the authentication of user to the merchant, the user device 30 transmits an authorization request to the sponsor station 50, step 910 of FIG. 9a. The authorization request includes the user's user ID which is stored as part of the logged-in ticket on memory 1170. The user device 30 retrieves the user ID from memory 1170, the user device 30 does not prompt the user to enter the user ID. This transmission is sent using a Message Authentication Code (MAC) using R12. As will be understood by one skilled in the art, a MACed message is not encrypted, rather it includes a number string appended to the message which authenticates the sender of the message to the receiver of the message and assures integrity of the message content. The user device 30 MACs the authorization request with R12. The sponsor station 50 processes the received message to authenticate the user based upon the MACed message, step 515. Then, the sponsor station 50 generates and transmits an acknowledgement message to the user device 30. This is also MACed with R12, step 916.

The user device 30 authenticates the received acknowledgment and encodes a 36 byte hash, provided by the merchant server 40, step 920, preferably being the running hash of a client-side SSL handshake sequence. Preferably, the 36 byte hash is encoded using the PKCS1 algorithm, though other well known algorithms could be used. Next, the user device 30 encrypts the 36 byte hash and a time stamp with R12 and transmits both to the sponsor station 50, step 925.

The sponsor station 50 decrypts encoded 36 byte hash and time stamp using R12, step 930. Next, the sponsor station 50 signs the encoded 36 byte hash with $D_2$, the second private portion of the multifactor asymmetric crypto-key, step 935. The sponsor station 50 generates a fresh time stamp, recalls R1 from memory 1170', and transmits the time stamp, the signed encoded 36 byte hash, and R1 to the user device 30, all encrypted with R12, step 940.

The user device 30 decrypts the time stamp, the signed encoded 36 byte hash, and R1 using R12, step 945. Then, the user device 30 recalls encrypted $D_1$ from the memory 1170 and decrypts $D_1$ using R1 obtained from the sponsor station 50, step 950. The user device 30 then uses $D_1$ to complete the signature of the encoded 36 byte hash and transmits the fully signed 36 byte hash to the merchant server 40, step 955. To complete the transaction, the user device 30 transmits a 'done' message to the sponsor station 50, step 960.

Alternately the encoded 36 byte hash could be first signed on the user device 30 using $D_1$ decrypted via R12 and the signature completed on the sponsor station 50 using $D_2$.

Roaming

Introduced above, $D_{tether}$ may be moved to additional user devices 30-33 besides the one upon which it was created. This movement of $D_{tether}$ is known as roaming. In the preferred embodiment, roaming is provided via an extension to the key generation protocol. This extension will be discussed in the context of user device 32 communicating with the sponsor station 50 to associate a multifactor asymmetric crypto-key with a user. However, it should be understood that the same extension applies when communications are between a user device 30-33 and a merchant server to establish such an association.

During key generation the sponsor station 50 preferably transmits one or more secret questions to the user device 32 in the clear via network 10, after the user device 32 has generated, or received, $D_{tether}$. The secret question(s) will be referred to herein as part A. Alternatively, the sponsor station 50 could transmit a trigger to cause secret question(s) already stored on the user device 32 to be presented to the user. It should be appreciated that the secret question(s) asked a particular user could be varied by the sponsor station 50 based upon any desired factor. Further, it should be understood that the number of secret questions asked a particular user could likewise be varied based upon any desired factor.

The user enters answers to the secret question(s) on the user device 32. The answer(s) will be referred to herein as part B. The user device 32 then uses parts A and B as inputs to the PKCS-5 algorithm, discussed above. After the entering of part B, the user device 32 performs the PKCS-5 algorithm twice, with the only difference between the two performances being the value of the iteration count. The first iteration count is preferably 99, and the second iteration count is preferably 100. However, it will be appreciated that any two different iteration counts could be used where the second is larger than the first. Based upon the output of the PKSC-5 algorithm, two symmetric keys are produced, preferably in accord with the well known DES3 standard. These keys will be referred to as DES3-99, and DES3-100. In the PKCS-5 algorithm, part B is used as the password, and part A is used as the salt. Alternatively, for example if part A is not transmitted to the user device 32, but instead is stored thereon, the user's id could be used as the salt.

After generation of DES3-99 and DES3-100, the user device 32 encrypts $D_{tether}$ with the first of the two DES3 keys, in this example, DES3-99. The encrypted $D_{tether}$ along with the second of the two keys, in this example DES3-100, is transmitted from the user device 32 to the sponsor station 50 via network 10. The sponsor station 50 then stores the received encrypted $D_{tether}$ and DES3-100 in memory 1070' in association with that user's user ID.

Whenever this user desires to move $D_{tether}$ onto a different user device 30-33 the user accesses the sponsor station 50 from that different user device 30-33 and the sponsor station 50 transmits part A to the different user device 30-33, in the clear or encrypted with server side SSL. The user enters the same answers previously entered and once again DES3-100 and DES3-99 are computed, this time by the different user device 30-33, based upon part B. DES3-100 is now available to be used as a shared symmetric key, as both the user and the sponsor station 50 have a copy thereof. Proof of possession of DES3-100 by the different user device 30-33 is made to the sponsor station 50, i.e., the user is authenticated using any authentication technique desired.

After authentication, the sponsor station 50 transmits the stored encrypted copy of $D_{tether}$ to the different user device 30-33 via network 10. This transmission is encrypted with DES3-100. The different user device 30-33 is then able to decrypt $D_{tether}$ using the copy of DES3-99 it generated. Thereafter, the different user device 30-33 stores $D_{tether}$, which, as discussed above, could be in any of several places on or associated with this user device 30-33. Those with ordinary skill in the art will understand that successful communication using DES3-100 establishes correct knowledge of Part B by the user and that storage of DES3-100 on the sponsor station does not enable decryption of $D_{tether}$.

As desired, the ability of a user to roam may be limited. For example, the number of user devices 30-33 onto which $D_{tether}$ can be moved can be limited. Also, the actual machines onto which $D_{tether}$ can be moved can be limited. Other variations include only performing the above-described extension to key generation when a user desired to roam, not during the actual key generation processing. In this way, the encrypted copy of $D_{tether}$ stored could be destroyed after a certain period of time, forcing a user to actually move $D_{tether}$ down onto a different user device 30-33 within a predetermined period of time after performance of the extension of the key generation protocol.

In an alternative approach to roaming, a user is associated with multiple, different, $D_{tether}$s. This results in a modified login protocol from that discussed above. In the modified login protocol, $D_1$ is no longer based upon a password, $D_{tether}$, and $D_{USB}$. Rather, $D_1$ is based only upon $D_{USB}$ and the password. However, SPR is still determined as described above, i.e., based upon $D_{USB}$, and any one of the multiple $D_{tether}$s. Each of the multiple $D_{tether}$s is, as will be understood, associated with a unique $E_{tether}$. Each $D_{tether}$ is associated with a single, particular user device 30-33. Each of the $E_{tether}$s is stored in association with the user id at the entity with which the key association was made. Also stored is an indication of the single, particular user device 30-33 with which a particular $E_{tether}$ is associated. During Login, information identifying a particular user device 30-33 from which login is being performed is transmitted to the particular device being accessed, i.e., sponsor station 50 or a merchant server 40-41, so that the correct $D_{tether}$ is utilized in decrypting SPR. In this manner, each user is associated with a single certificate because each user is associated with a single $D_1$.

Kiosk Mode

Roaming, discussed above, is but one technique provided by the present invention which enables a user to securely transmit information via network 10. Introduced above, D is split into $D_1$ and $D_2$. However, any particular D can be split more than one way. The kiosk mode leverages this fact to provide a user multiple levels of network access. In the kiosk mode, D is split two different ways, resulting in not only $D_1$ and $D_2$, discussed above, but also $D_3$ and $D_4$. More particularly, $D_3$ is based upon the password only, and $D_4$ is the complement to $D_3$, as will be understood by one of ordinary skill in the art. So, as commonly understood, E*D=1 mod F(N). The D is split twice, with one split being $D_1*D_2$=D mod F(N), and the other split being $D_3*D_4$=1 mod F(N). The second split, based upon the password only, can be called the zero footprint split.

As desired, $D_3$ could be generated from information other than, or in addition to, the password. For example, $D_3$ could be generated from the password and $D_{USB}$, or any other information different than that utilized to generate $D_1$. However, it is most desirable that $D_3$ be based upon the user's password only, as the user will most typically be operating under kiosk mode will at a user device 30-33 other than the user device 30-33 upon which $D_{tether}$ is stored.

Preferably, when a user is not at the user device 30-33 upon which his or her $D_{tether}$ is stored, the user transmits his or her user id and password to a merchant server 40-41. As desired, this could be via a special kiosk mode user presentation. Typically, this transmission will be protected by server side SSL. The receiving merchant server then will authenticate the user based only upon the received user id and password by converting the received password into D3 and demonstrating knowledge of D3 to a sponsor station 50 which verifies this knowledge by means of D4 stored in memory 1170'.

Authentication via kiosk mode will preferably result in a different level of access, i.e., information that requires a higher level of security will not be available via the kiosk mode. In kiosk mode, a lowest level of security is provided, based upon the password only. Thus, kiosk mode can be referred to as a single factor mode. In a two factor mode, a higher level of security is provided based upon the password and either of $D_{tether}$ or $D_{USB}$. And, in a three factor mode, a highest level of security is provided, based upon the password, $D_{tether}$, and $D_{USB}$. A particular server may be a legacy server that only uses passwords, not additional factors. Or, a particular server may only host non-sensitive information, and thus a higher level of security is not needed. In both cases, such a server might employ only single factor or double factor security.

Further, a same server can now offer multiple levels of security utilizing the present invention. Thus, for example, a user can log on under kiosk mode based upon only his or her password/user id combination, or that same user can log on, to the same server, based upon his or her password/user id, as well as one or both of his or her $D_{tether}$ and/or $D_{USB}$. It should also be noted that, as desired, the multiple levels of access could be from the same user device 30-33.

Still further, different users could be, as desired, associated with one or more different levels of access. Thus, for example, a first user could be allowed to only log on under three factor security, a second user could be allowed to log on under either one or three factor security, and a third user could be allowed to log on under only single factor security. It will be appreciated that other combinations of access, based upon a user's identity, a server, or other network appliance, being accessed, the type of information being accessed, and/or the particular user device 30-33, or type of user device 30-33, being used by a user may be had. This has the powerful business benefit that a single security system can issue credentials of different strengths to different users, allowing strength to be appropriately matched to need.

Somewhat different than kiosk mode, though also resulting in a lower level of security, a second and/or third factor does not have to be a crypto-graphic key, or even a random number. A factor could be a property of the user device 30-33, such as a hard drive serial number, available to the user device 30-33 for use in encrypting information. So, if a high level of strength is not desired, a second and/or third factor might not be a cryptographic key. Further, as desired, when multiple factors are utilized, the multiple factors could be merely concatenated instead of algorithmically combined, as described above. However, it will be recognized by one of ordinary skill in the art that a simple concatenation will not produce a high level of security.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. in providing security for Internet communications, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. An article of manufacture for providing different levels of access based upon a same authentication factor, comprising, computer readable storage media: and computer programming stored on the storage media, wherein the stored computer programming is configured to be readable by one or more computers and thereby cause the one or more computers to operate so as to;

receive a first message transformed with a first portion of a split private key, the first portion based upon a user password and another factor, different than the user password, with both factors being under the control of the user, and the split private key associated with an asymmetric key pair having a public key and the split private key;

authenticate the user for a first level of network access based upon the received first message being transformed with the first portion; receive a second message transformed with a second portion of the split private key, the second portion based upon the user password only and not combinable with the first portion to complete the split private key; and authenticate the user for a second level of network access different that the first level based upon the received second message being transformed with the second portion.

2. The article of manufacture of claim 1, wherein: if authenticated for the first level of access, first information is available to the user; and if authenticated for the second level access, second information is available to the user.

3. The article of manufacture of claim 2, wherein the second information is only a portion of the first information.

4. The article of manufacture of claim 1, wherein:
 the first message is received from a first network station;
 the other factor is stored at the first network station; and
 the second message is received from a second network station at which the other factor is not stored.

5. The article of manufacture of claim 1, wherein the stored computer programming is further configured to thereby cause the one or more computers to operate so as to: generate an asymmetric key pair having a private key and a public key; split the private key, based upon the password only, into a second set of multiple private portions including the second private portion.

6. The article of manufacture of claim 1, wherein the stored computer programming is further configured to thereby cause the one or more computers to operate so as to: transform the received first message with a third portion of the split private key, the public key of the asymmetric key pair, and at least one other public key to determine that the received first message is transformed with the first portion; and transform the received second message with only a fourth portion of the split private key and the public key of the asymmetric key pair to determine that the received first message is transformed with the second portion.

7. The article of manufacture of claim 1, wherein the first portion is generated by cryptographically combining the user password and the other factor.

8. The article of manufacture of claim 1, wherein: the asymmetric key pair is a first asymmetric key pair; the first portion is based three factors; a first factor is the user password; a second factor is a private key of a second asymmetric key pair; and a third factor is a private key of a third asymmetric key pair.

9. The article of manufacture of claim 8, wherein: the password is not stored in a persistent state; the private key of the second asymmetric key pair is stored in a first location; and the private key of the third asymmetric key pair is stored in a second location different than the first location.

10. A system for providing different levels of access based upon a same authentication factor, comprising: a communications interface configured to receive i) a first message transformed with a first portion of a split private key, the first portion based upon a user password and another factor, different than the user password, with both factors being under the control of the user, and the split private key associated with an asymmetric key pair having a public key and the split private key, and ii) a second message transformed with a second portion of the split private key, the second portion based upon the user password only and not combinable with the first portion to complete the split private key; and a processor configured to i) authenticate the user for a first level of network access based upon the received first message being transformed with the first portion, and ii) authenticate the user for a second level of network access different that the first level based upon the received second message being transformed with the second portion.

11. The system of claim 10, wherein:
 if authenticated for the first level of access, first information is available to the user; and
 if authenticated for the second level of access, second information is available to the user.

12. The system of claim 11, wherein the second information is only a portion of the first information.

13. The system of claim 10, wherein:
 the first message is received from a first network station;
 the other factor is stored at the first network station; and
 the second message is received from a second network station at which the other factor is not stored.

14. The system of claim 11, wherein the processor is a first processor, and further comprising:
 a second processor configured to i) generate an asymmetric key pair having a private key and a public key, ii) split the private key, based upon the password and the other factor, into a first set of multiple private portions including the first private portion, and iii) split the private key, based upon the password only, into a second set of multiple private portions including the second private portion.

15. The system of claim 10, wherein the processor is further configured to i) transform the received first message with a third portion of the split private key, the public key of the asymmetric key pair, and at least one other public key to determine that the received first message is transformed with the first portion, and ii) transform the received second message with only a fourth portion of the split private key and the public key of the asymmetric key pair to determine that the received first message is transformed with the second portion.

16. The system of claim 10, wherein the first portion is generated by cryptographically combining the user password and the other factor.

17. The system of claim 10 wherein:
 the asymmetric key pair is a first asymmetric key pair;
 the first portion is based three factors;
 a first factor is the user password;
 a second factor is a private key of a second asymmetric key pair; and
 a third factor is a private key of a third asymmetric key pair.

18. The system of claim 17, wherein:
 the password is not stored in a persistent state;
 the private key of the second asymmetric key pair is stored in a first location; and
 the private key of the third asymmetric key pair is stored in a second location different than the first location.

* * * * *